United States Patent [19]
Kuwahara et al.

[11] Patent Number: 5,157,660
[45] Date of Patent: Oct. 20, 1992

[54] COMMUNICATION SYSTEM INCLUDING PORTABLE TERMINALS AND FIXED TERMINALS

[75] Inventors: Hiroshi Kuwahara, Kodaira; Nobuo Tsukamoto, Tachikawa; Kumiko Takikawa, Tama; Yuji Sakamoto, Kokubunji; Shirou Tanabe, Hachioji, all of Japan

[73] Assignee: Hitachi, Ltd., Tokyo, Japan

[21] Appl. No.: 586,242

[22] Filed: Sep. 21, 1990

[30] Foreign Application Priority Data

Sep. 25, 1989 [JP] Japan .................. 1-246275

[51] Int. Cl.[5] .................. H04J 3/16; H04J 1/00
[52] U.S. Cl. .................. 370/95.1; 370/110.1; 455/54.1
[58] Field of Search .................. 370/94.1, 94.2, 95.1, 370/95.3, 110.1, 85.1, 58.1; 455/33, 34, 53, 54, 56; 379/58, 59, 60, 61

[56] References Cited

U.S. PATENT DOCUMENTS

| 4,633,463 | 12/1986 | Mack | 370/95.1 |
| 4,745,632 | 5/1988 | Duffy | 455/54 |
| 5,040,177 | 8/1991 | Martin et al. | 379/61 |

Primary Examiner—Douglas W. Olms
Assistant Examiner—T. Ghebretinsae
Attorney, Agent, or Firm—Antonelli, Terry, Stout & Kraus

[57] ABSTRACT

A communication system including a plurality of portable terminal apparatuses each capable of calling a partner terminal apparatus via a radio channel and a plurality of fixed terminal apparatuses each being connected via an ISDN interface to a time-division switch and each being connectable to the portable terminal in which when two portable terminals having an established cell are respectively attached to two fixed terminal apparatuses arbitrarily selected, the state of the call is automatically transferred to the two fixed terminal apparatuses so that the speech can be achieved between the fixed terminal apparatuses without conducting another call establishing procedure.

3 Claims, 17 Drawing Sheets

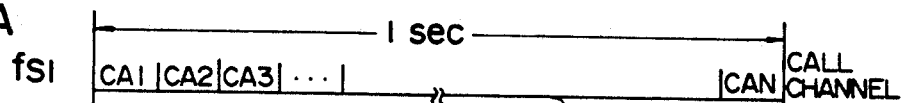
FIG. 2A fs1 — CALL CHANNEL
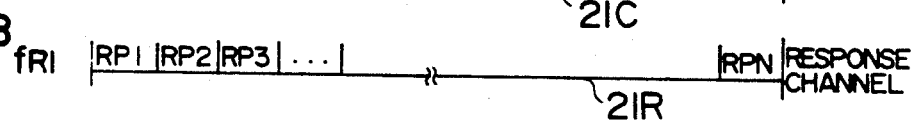
FIG. 2B fR1 — RESPONSE CHANNEL
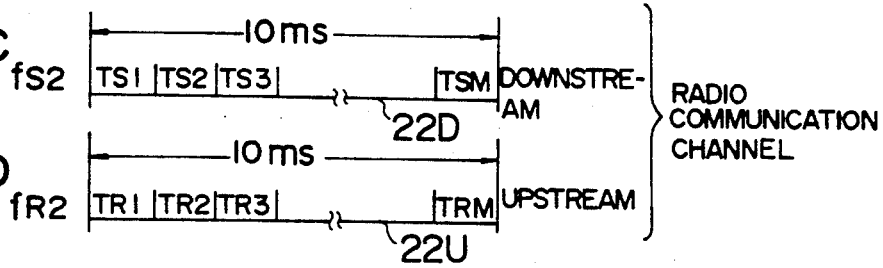
FIG. 2C fs2 — DOWNSTREAM
FIG. 2D fR2 — UPSTREAM
RADIO COMMUNICATION CHANNEL
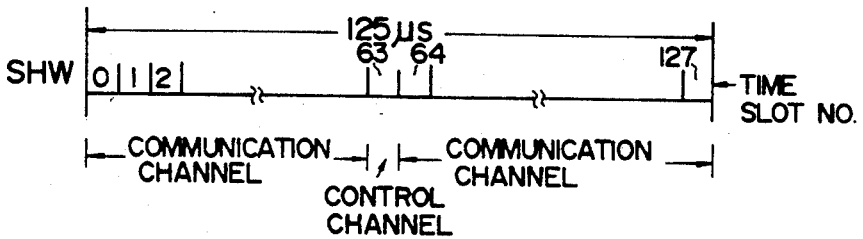
FIG. 3A SHW — TIME SLOT NO.
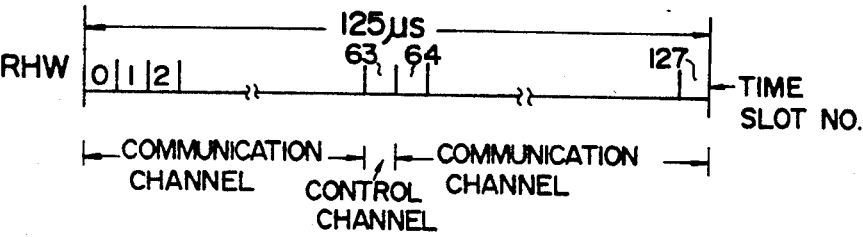
FIG. 3B RHW — TIME SLOT NO.

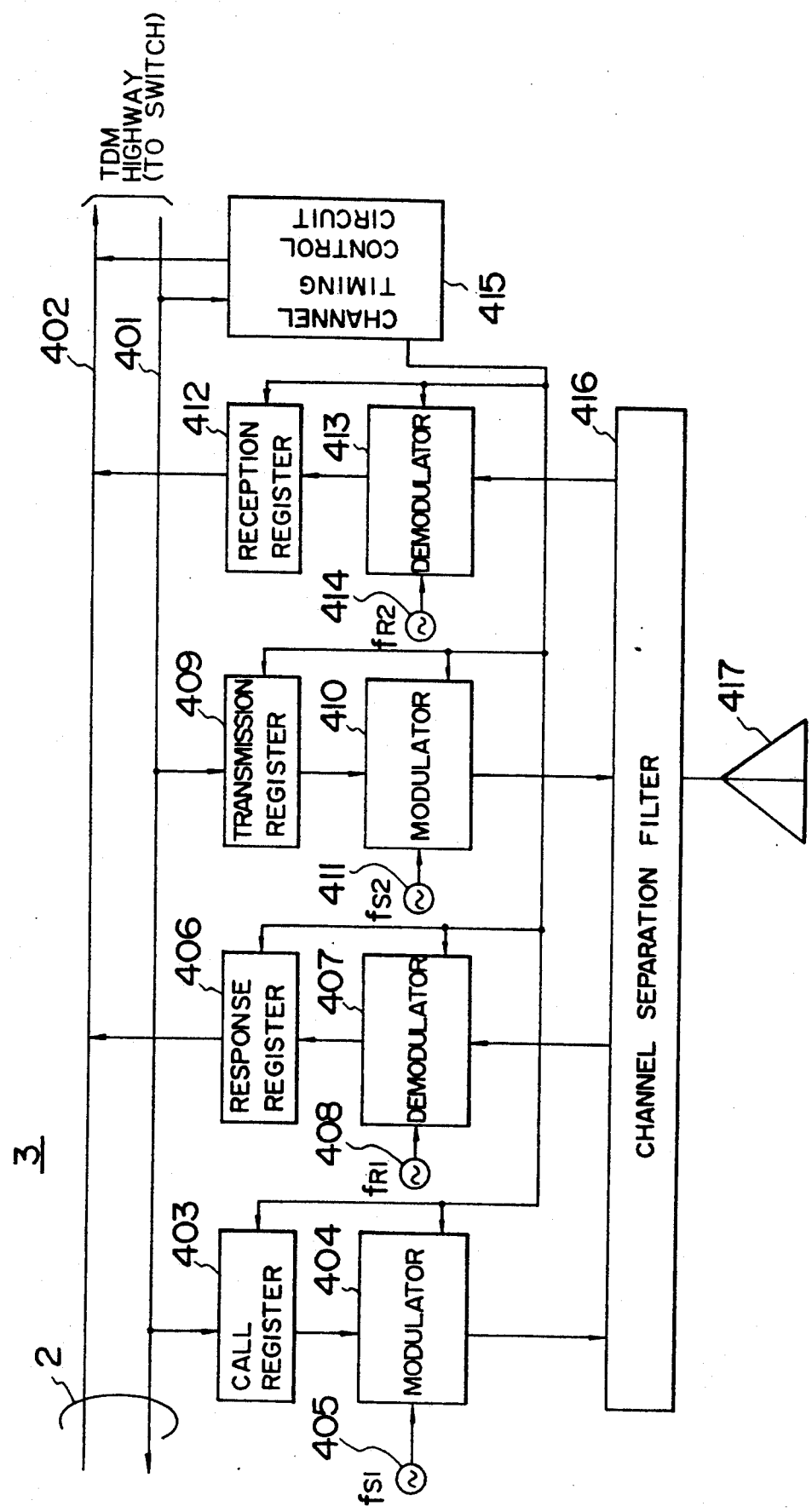

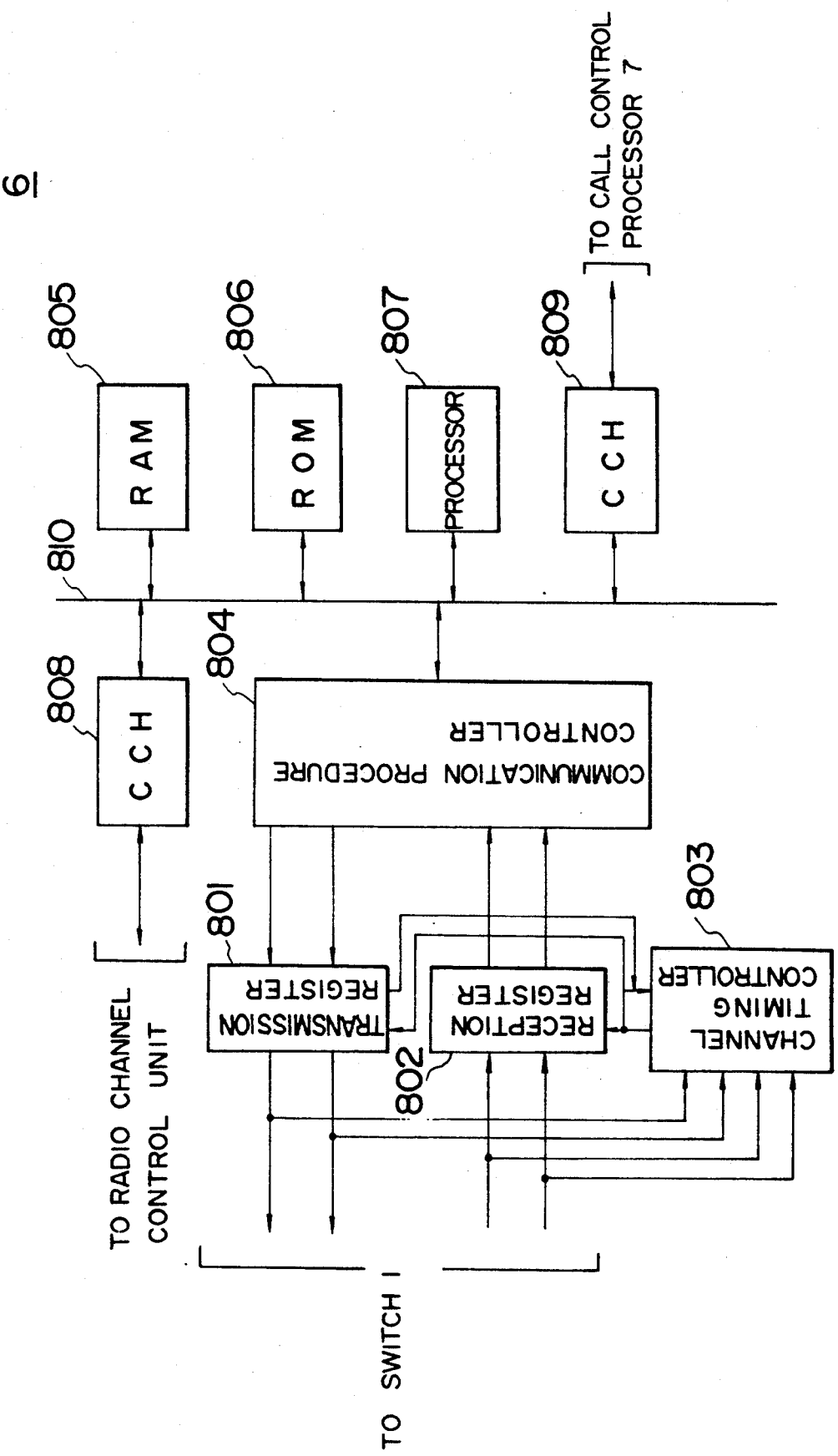

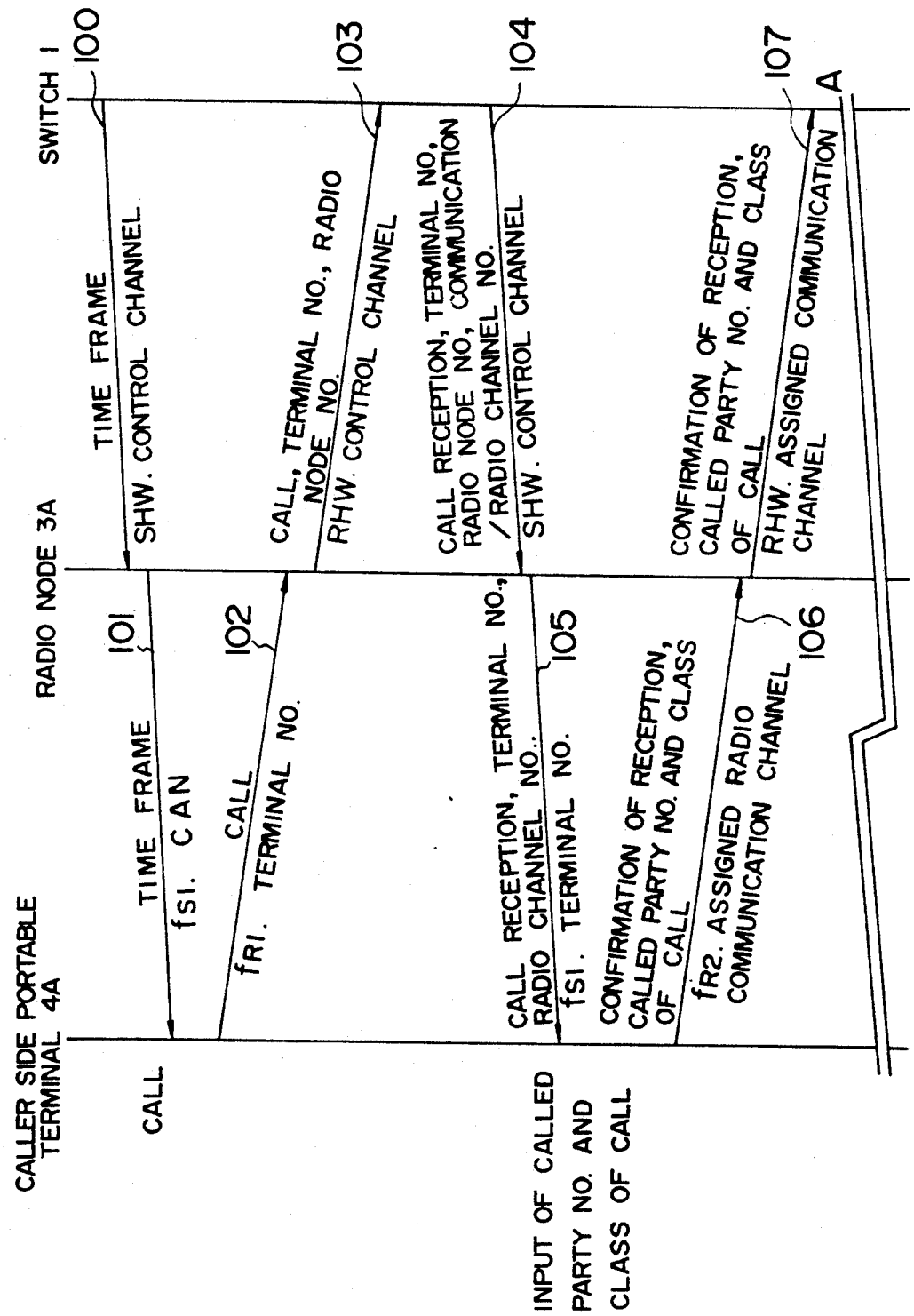

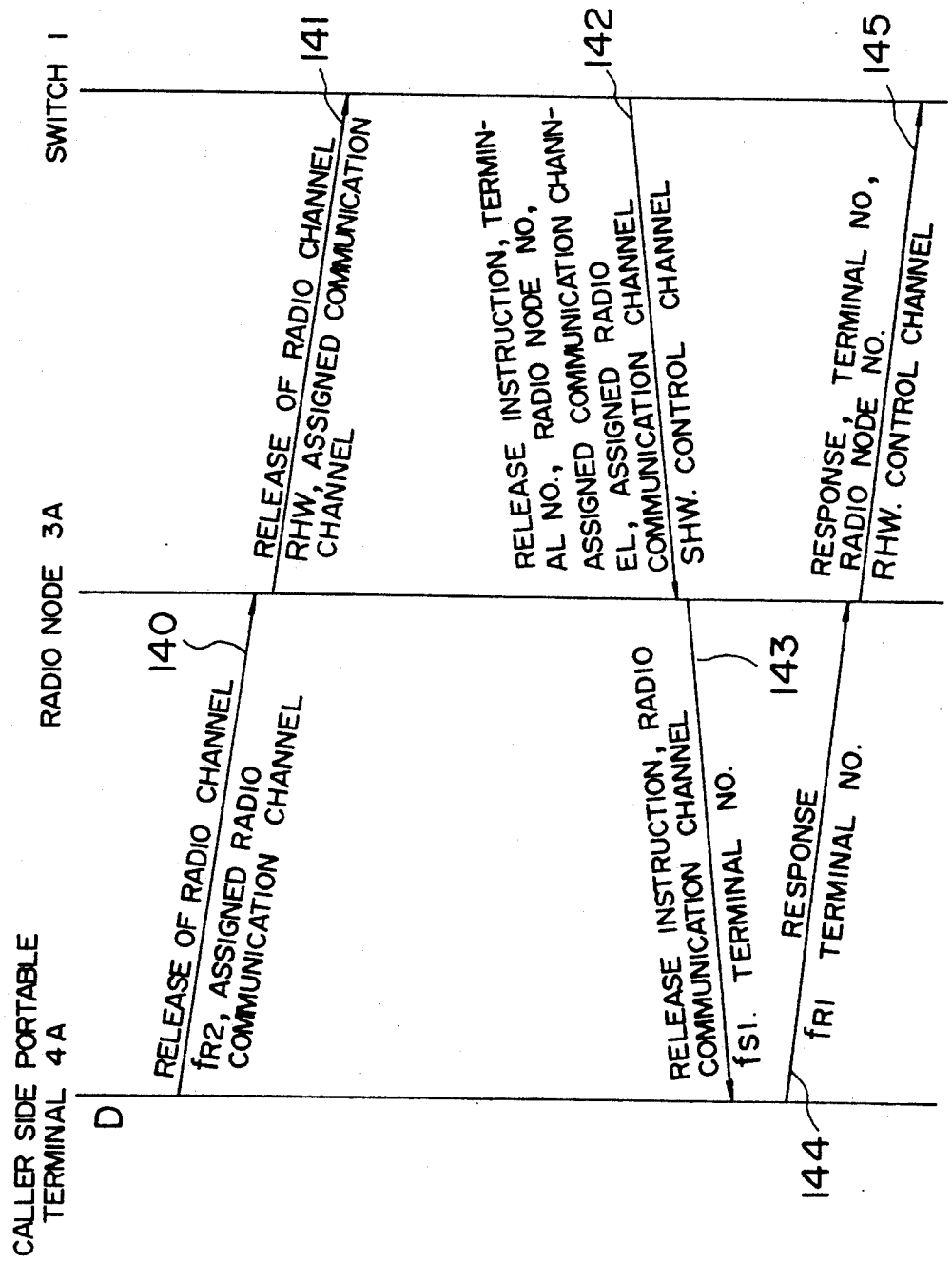

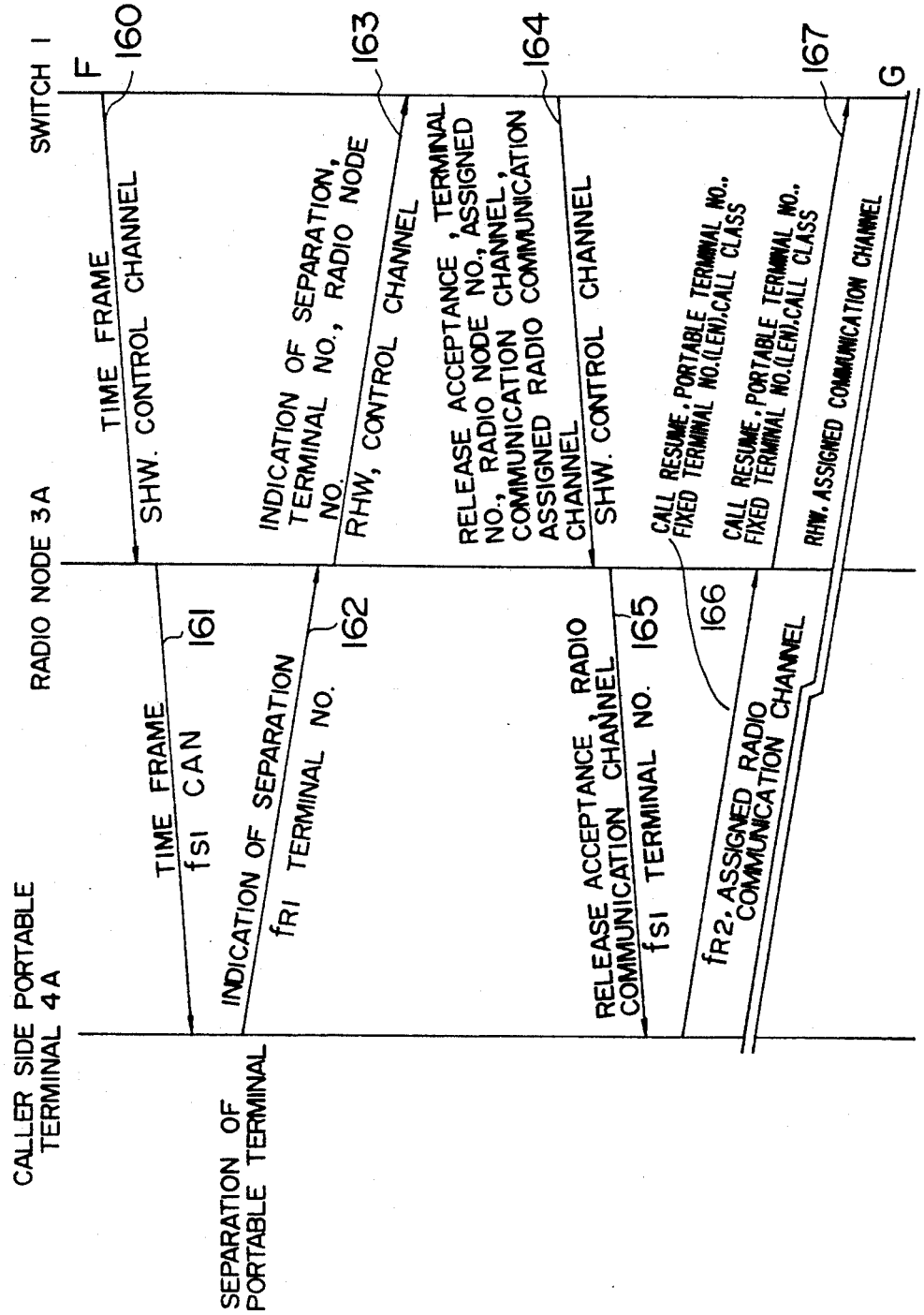

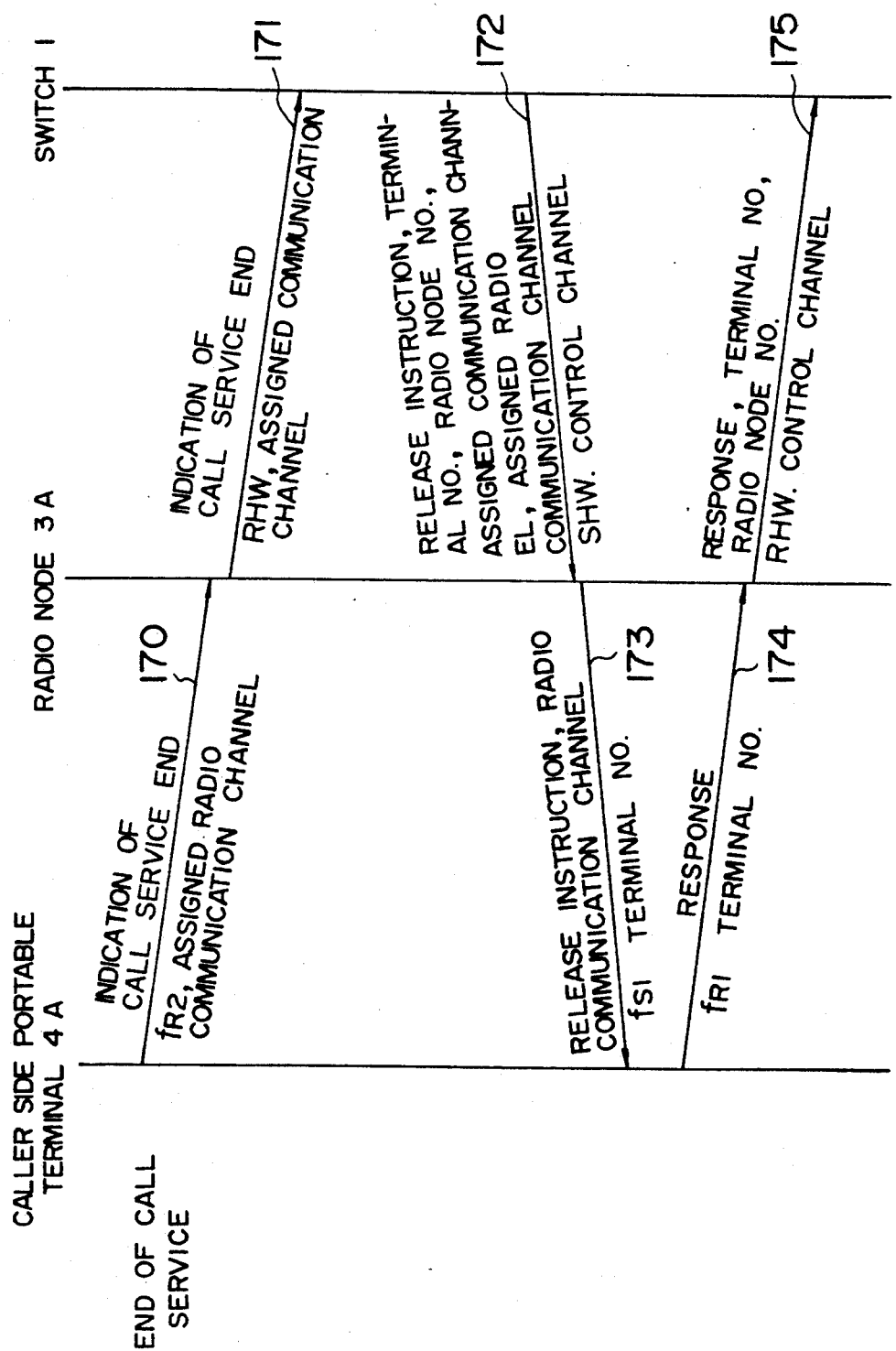

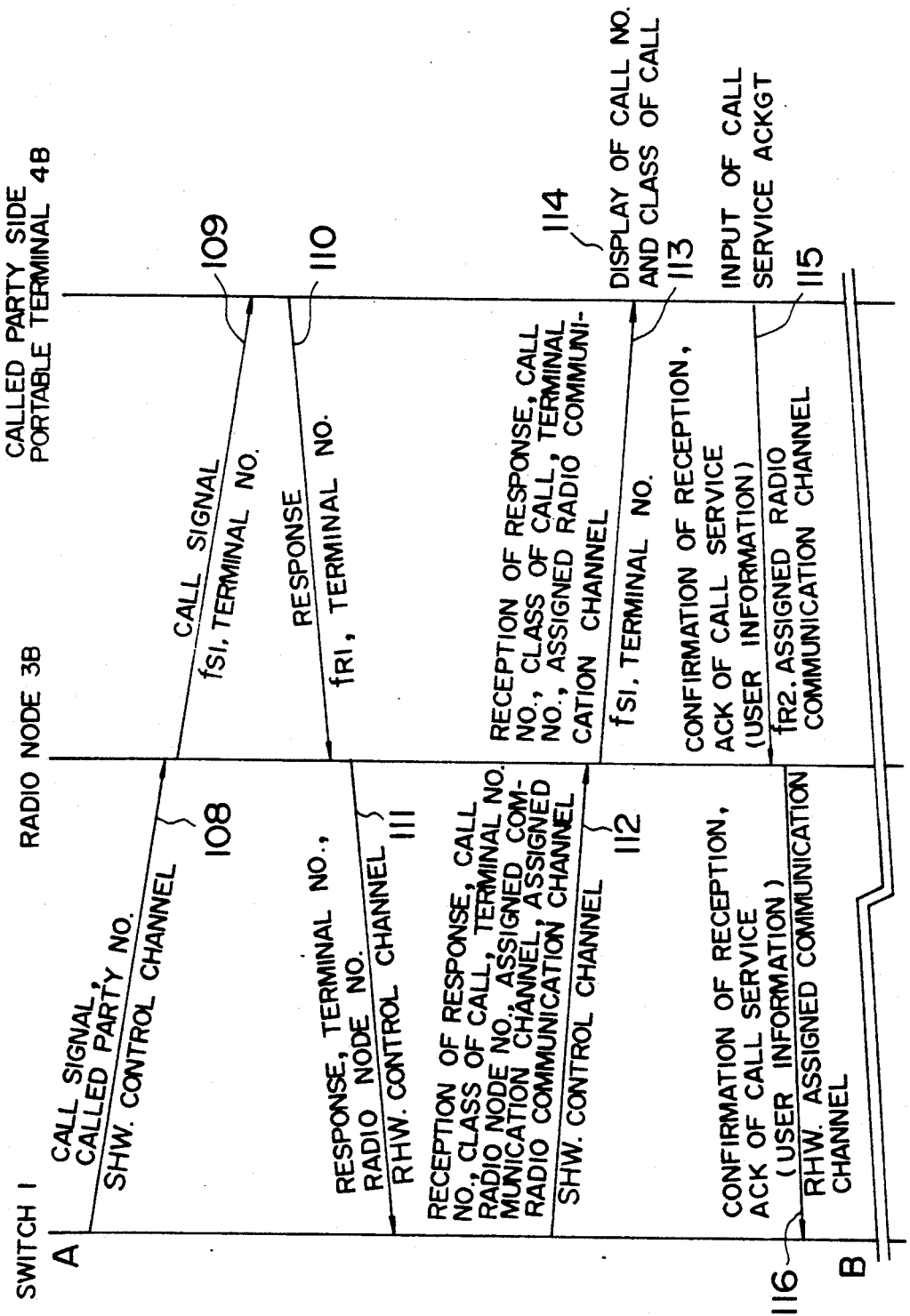

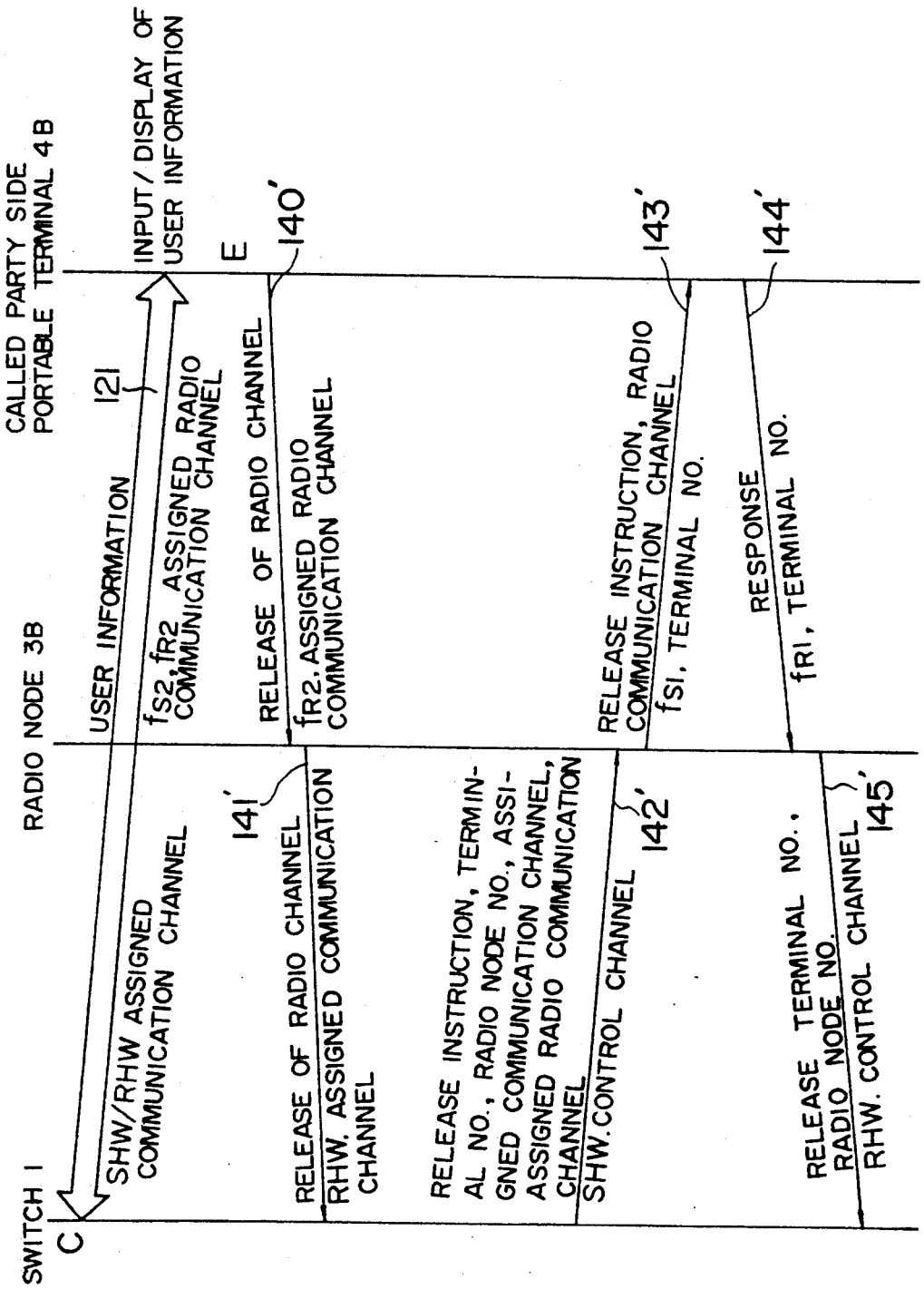

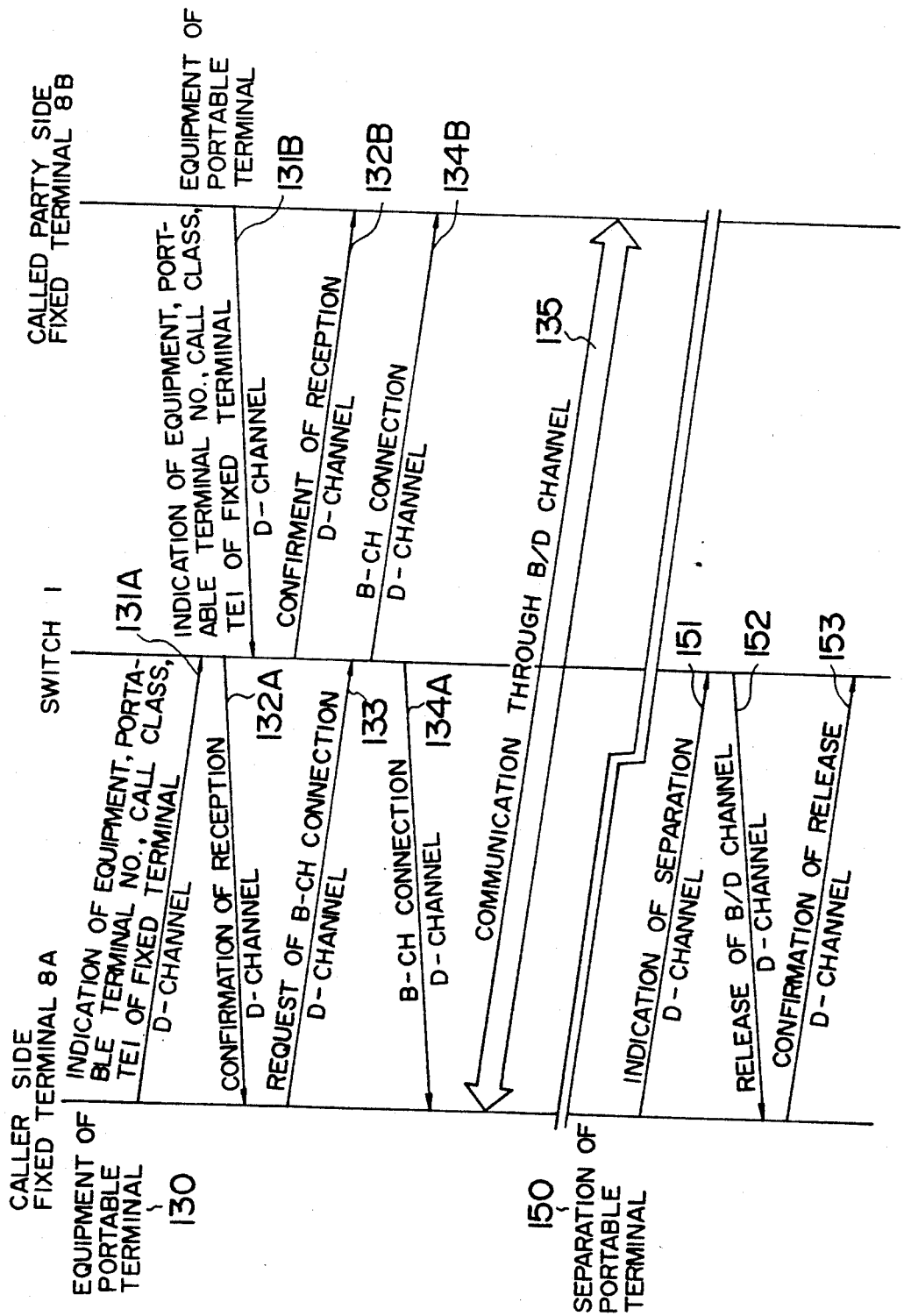

COMMUNICATION SYSTEM INCLUDING PORTABLE TERMINALS AND FIXED TERMINALS

BACKGROUND OF THE INVENTION

1. Field of the Invention

The present invention relates to a personal communication system, and in particular, to a communication system including portable terminals each having a personal call function and fixed terminals which can be connected to the portable terminals.

2. Description of the Related Art

In a conventional telephone system, each telephone set is assigned with a number (called a telephone number) such that when a user dials a telephone number of a telephone set on a call termination side from a telephone set on a call initiation side, a communication path is established between the telephone sets. This system however is attended with a problem, namely, when the telephone partner on the destination side is absent, the telephone call cannot be conducted.

In contrast to the system above, there has been employed a calling system called a pocket-bell system or a portable radio terminal system in which a person apart from the telephone set is notified that an attempt of a telephone call has been made to the telephone set. In the conventional system associated with the pocket bells and/or portable radio terminals, the person to whom the telephone call has been attempted issues a call to a predetermined telephone set to identify the call initiating person so as to thereafter dial a telephone number of the call initiator. In an improved version of the pocket bell system, the telephone number of the call initiator is displayed at the call issuance so that the person on the call termination side directly dials the Presented telephone number.

An improved communication system in which portable radio terminals and telephone sets are employed in combination has been described, for example, in the JP-A-60-103834 and the JP-A-61-94422.

In a personal call communication system described in the JP-A-60-103834, there are utilized a portable radio terminal manufactured in a form of a card to which a personal identification (ID) number of a card Possessor is assigned and a telephone set having a function to read, when the portable radio card is combined with the telephone set, information items such as the personal identification number therefrom. A call initiator dials, in a state where the portable radio card in linked with the telephone set, a telephone number of a call destination partner. The identification number of the call initiator and a call initiating telephone number read from the portable radio card and the telephone number of the call destination thus dialed are sent to a switch and then supplied therefrom to a central controller connected to the switch. The central controller has a table including correspondences between telephone numbers, identification numbers, and personal names so as to convert the call destination telephone number and the call initiator identification number into a call destination identification number and call initiator name, respectively The obtained number and name are broadcast through a radio wave to each portable radio card via a personal call unit (radio transmission station).

In each portable terminal or card, when the received call destination identification number matches the identification number of the portable terminal or card, the call initiator name from the personal call unit is presented on a display screen of the portable card; moreover, an audible signal is produced to notify the call to the card proprietor. On recognizing the call tone, the called person combines the card with a telephone set nearby, so that the identification number of the called person is read from the card and is then sent to a switch so as to be delivered to the central controller. The central controller has a call control table storing therein an identification number under a call and a telephone number of the call initiator. On receiving the identification number of the call destination person, the controller reads the telephone number of the caller from the call control table to establish a call or speech path between the call initiating telephone set and the call terminating telephone set.

In the communication system described in the JP-A-61-94422, when an identification number of a portable radio terminal as a call destination is dialed from a telephone set on a call initiation side, a telephone number of the call initiating telephone set and the identification number of the portable radio terminal are radio broadcast. When a call destination person connects, on recognizing the call, the portable radio terminal to a nearby telephone set, the telephone number of the call initiating telephone set is automatically transmitted so that the telephone set on the call initiation side is connected via a switch to the telephone set on the call termination side.

SUMMARY OF THE INVENTION

It is an object of the present invention to provide a communication system which comprises portable terminals each being accessible by use of a personal number of a possessor thereof and fixed terminals connectable to the portable terminals and in which the proprietor of the portable terminal can easily use the portable terminal and the fixed terminal in combination as well as in a separate manner.

Another object of the present invention is to provide a communication system in which a state of a call established between portable terminals in a situation where the portable terminal is disconnected from a fixed terminal can be kept retained even when the portable terminal is linked with the fixed terminal, thereby unnecessitating a procedure for re-establishing a call for a telephone set or a portable terminal as a call partner.

In order to achieve the objects above, in a system according to the present invention, there is applied a D-channel function stipulated in the basis or primary interface of the integrated service digital network (ISDN). The D channel is adopted for sending and for receiving signals according to the ISDN interface to control (operations such as a call initiation, a call termination, a call transfer, a call reservation, and a call interruption) of calls established on channels multiplexed in an identical subscriber line including other channels and own channels (so-called 2B+D in the basic interface and 23B+D in the primary interface). Since the send and receive operations of the call control signals are conducted through a channel logically different from channels used for communication (speech) signals transferred between users (i.e. a so-called out-band signaling), there can be implemented considerably a large variety of call control functions in this signaling system as compared with control functions developed in the in-band signaling of the conventional telephone switch (in which communication signals and call control signals are transferred through an identical logical channel such that a signal therethrough is treated as a communication or call control signal depending on call states). A switch system supporting the ISDN terminal interface can realize a new service function based on the call control through the D channel.

In accordance with the present invention, the D-channel communication function of a conventional ISDN terminal possessing the ISDN interface is realized via a radio channel between a portable terminal and a switch. When a portable terminal is connected to a fixed terminal linked via a wire to a switch (the connection may be established in a mechanical fashion or in such a manner that an intercommunication is conducted through a weak radio wave), the call processing is passed to the D channel of the fixed terminal so as to control calls established on the D and/or B channels of the fixed terminal. With this provision, there are implemented various service items by use of a combination of the portable terminal and the fixed terminal like in the case of the ISDN terminal in a wire communication. Furthermore, operation programs prepared for the various service items developed for such ISDN terminals can be directly used in the system above without any modifications or with a relatively small number of modifications.

Conventionally, in the call control protocol processing of the ISDN terminal, it has been assumed that the D channel and the B channel for which the call control is achieved through the D channel are logically multiplexed on an identical physical line. Moreover, it is also assumed as a premise that when a call is to be continued, the connections of layers 1 and 2 of the open system interconnection (OSI) are also continued.

According to the concept of "call" above, a call is controlled in layer 3, namely, various control operations are achieved to keep or to manage various kinds of state transition (related to a call initiation state, a state in which a call termination dial is being received, and the like) appearing while a call is processed and a set of parameters (such as a terminal address, a line number, etc.) necessary for setting a call. In the foregoing text, this call is to be continued. Conventionally, the processing of the layer 3 has been accomplished on assumption of the conditions associated with the layers 1 and 2.

In accordance with the present invention, a portable terminal and a switch establish a call on the D channel via a radio channel. Subsequently, when the portable terminal is attached to a nearby fixed terminal, the call connection is passed to a D channel on a wire (a subscriber line) between the fixed terminal and the switch. Furthermore, when the portable terminal is separated from the fixed terminal, the call is transferred onto a radio channel assigned at the moment of the separation.

For the transfer of the call, in a case, for example, where also the call is to be passed, parameters related to the layers 1 and 2 of the call need only be replaced with appropriate items in association with a change in a physical connection state between the terminal and the switch. As an alternative procedure, there may be adopted a method in which when constitutional elements of the layers 1 and 2 are exchanged, another call is established or a method in which even when a portable terminal is installed in a fixed terminal, a radio channel first allocated is kept retained during the continuation of the call. However, in order to implement the former method, the call processing programs of the layer 3 and upper layers are required to be considerably modified as compared with call processing programs only associated with the ISDN terminals connected via subscriber lines of the wire communication. Moreover, when the latter method is introduced, the utilization ratio of radio channel resources is lowered, and hence this method cannot be easily applied to a system in which the utilization location of a portable terminal is moved with a call thereof kept continued.

The foregoing and other objects, advantages, manner of operations and novel features of the present invention will be understood from the following detailed description when read in connection with the accompanying drawings.

BRIEF DESCRIPTION OF THE DRAWINGS

FIGS. 2A to 2D are diagrams for explaining frame structures on a radio channel between a portable terminal and a radio node;

FIGS. 3A and 3B are diagrams showing frame configurations on a time-division highway between a switch and a radio node;

FIG. 4 is a block diagram showing in detail the configuration of a radio node 3;

FIG. 8 is a block diagram showing in detail the configuration of a D-channel packet handler 6;

FIGS. 9A to 9E are diagrams for explaining call connection control processing between a portable terminal on a call initiation side, a radio node on the initiation side, and a switch;

FIGS. 10A and 10B are diagrams for explaining call connection control processing between a switch, a radio node on a call termination side, and a portable terminal on the side;

FIG. 11 is a diagram useful to explain call connection control processing between a switch and a fixed terminal in which a portable terminal is installed;

DESCRIPTION OF THE PREFERRED EMBODIMENTS

Figure 1:
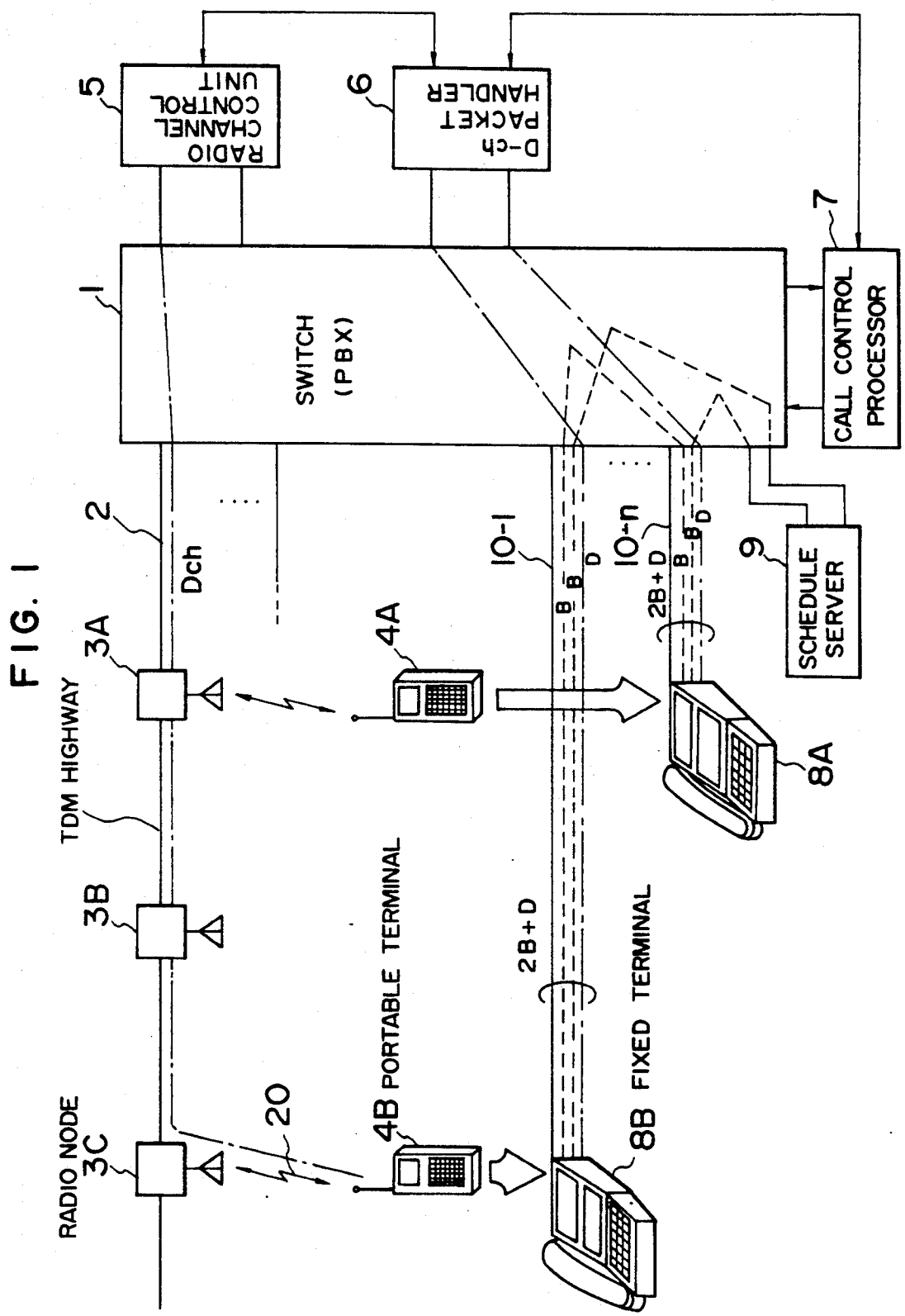
FIG. 1 is a schematic diagram showing the overall constitution of an embodiment of a communication system according to the present invention.

FIG. 1 shows the overall constitution of a communication system in accordance with the present invention. This system includes a time-division line exchange switch 1 constituting a private branch exchange (PBX), a time division highway 2 accommodated in the switch 1, and radio base station nodes 3 (3A to 3C). In this embodiment, although these nodes 3A to 3C are connected in a multidrop configuration to the highway 2, the multidrop configuration need not be necessarily adopted for the connections between the radio nodes 3A to 3C and the highway 2. For example, a star connection configuration may be employed, namely, a radio node is connected to an end of each highway. When installing the radio nodes 3A to 3C, in order to prevent radio waves emitted therefrom from interferring each other, the service range of the switch is subdivided into a plurality of cells such that a radio node is located at the center of each associated cell. For example, a room, a portion of a corridor, a meeting room, etc. are selected as the units of cells.

The configuration further includes portable wireless or radio terminals 4 (4A and 4B) each capable of conducting a low-speed duplex data communication with the radio nodes 3A to 3C by use of a very weak radio wave. These terminals 4A and 4B are connected to the switch 1 of the PBX via the highway 2 linked to the radio nodes 3A to 3C. In consequence, the portable radio terminals 4A and 4B can achieve duplex communications with all terminals connected to the switch 1. Moreover, these terminals 4A and 4B can communicate various kinds of call control information items with a call control processor (CP) 7 of the PBX via a radio channel control unit 5 and a D-channel packet handler 6 which are connected to the switch 1. The portable wireless terminals 4A and 4B carry out intercommunications, completely in conformity with the D-channel user interface stipulated for the ISDN user interface, with another terminal accommodated in the exchange, for example, another portable wireless terminal, with another terminal accommodated in the exchange by use of a wire and provided with the ordinary ISDN interface, and/or with the control processor 7 of the exchange.

This system further comprises fixed terminals 8 (8A and 8B) wired to the switch 1. Each fixed terminal 8 can be connected to the portable radio terminals 4 and is provided with such communication interfaces with respect to the switch 1 as the ISDN user interfaces including the 2B+D call and communication control functions. Incidentally, the fixed terminals 8A and 8B may be ordinary multifunctional telephone sets and/or multimedia terminals capable of handling both of the voice and data signals.

In the communication system above, each portable wireless terminal 4 is carried about by a personal user of the PBX telephone system and is assigned with a call number which is an identification (personal) number beforehand assigned to the user. A description will now be given of functions of the system in a case of a call initiation.

First, the call initiating person operates the own portable wireless terminal 4, namely, dials a personal or telephone number of a call destination person and inputs a character message notifying a telephone call or a command to automatically generate the message. The PBX switch 1 receives a radio signal of the call initiation from the portable terminal 4 via the radio node 3 in the vicinity of the terminal 4 and the TDM highway 2 so as to analyze the received signal in the radio channel control unit 5, thereby notifying the call initiation via the D-channel packet handler 6 to the call control processor 7. Based on the dialed personal number, the call control processor 7 determines a portable wireless terminal 4 of the call destination person through a path reverse to the reception path of the call initiation signal. Resultantly, a call termination of the telephone request takes place in the destination terminal in which information of the call initiator is indicated with characters, signal tones, or synthesized voices, or the like.

In a case where the person on the call destination side responds to the call request, the person transmits a character message of a response by use of keys on the portable terminal 4 to the call initiator and then connects the terminal to a fixed terminal 8 nearby. In the embodiment of FIG. 1, there is shown an example wherein each fixed terminal 8 is provided with an insertion hole in which a portable wireless terminal 4 is to be installed to establish a connection between the fixed terminal 8 and the portable terminal 4. In addition to the mechanical connection as above, the connection between these terminals may be achieved, for example, through a radio wave.

On the call initiator side, by recognizing the response message from the called person on the display of the own portable terminal 4, the call initiator attaches the own portable terminal 4 onto a fixed terminal 8 nearby. When the portable terminals 4 respectively of the call initiator and the call termination person are installed in the respective fixed terminals 8, there is automatically established a connection of the B channel therebetween through the switch 1, thereby enabling a speech to be conducted.

Next, let us consider a case where the person on the call destination side is required to move positions during a call or speech. Namely, this situation takes place in a case where, for example, when the called person in a meeting room is to move to the persons desk to refer to documents for the continuation of the call. In this case, the person removes the portable terminal from the fixed terminal to carry the portable terminal to the persons desk so as to install the portable terminal in a fixed terminal on the desk. In accordance with the present invention, the B channel connected to the fixed terminal in the meeting room is automatically linked with the fixed terminal on the person's desk, which enables the person to continue the speech at the desk. In a case where the called person desires to beforehand call the schedule server 9 of FIG. 1 at an intermediate point of a removal path from the meeting room to the person's desk, for example, for confirmation of the person's schedule, the person need only achieve the call operation by use of the keys of the portable terminal being removed. With this provision, when the portable terminal is attached onto the fixed terminal on the desk, the schedule server 9 can also be automatically connected to the fixed terminal on the desk through another B channel.

That is, in the system according to the present invention, when the portable wireless terminal is connected to the fixed terminal, the state of the D channel of the portable terminal is directly transferred onto the D channel of the fixed terminal. Moreover, control operations such as a connection of the B channel for which the portable terminal has already issued a call control request and which has not been yet achieved because the portable terminal is not connected to the fixed terminal can be executed immediately when the portable wireless terminal is installed in the fixed terminal, namely, when the connection is established therebetween. Reversely, various control states of the control developed when the portable terminal is attached to the fixed terminal or states of the user information transfer through the D channel are automatically transferred, when the portable terminal is separated from the fixed terminal, to the D channel connected between the portable terminal and the switch via a radio node.

Referring next to FIGS. 2A to 2D, 3A, 3B, and 4 to 8, a description will be given of a detailed configuration of the primary portion of FIG. 1.

FIGS. 2A to 2D show configurations of frames on the channel 20 for duplex wireless communications between the radio nodes 3 and the portable wireless terminals 4. This embodiment adopts channel configurations associated with the time division multiple access (TDMA) system. However, in principle, other systems may also be applicable to the system.

For the radio channel 20, there are disposed two kinds of channels including a call/response channel 21 and a radio communication channel 22. Different frequencies are assigned to the transmission and reception through each channel, namely, there are adopted four kinds of frequencies. Concretely, these frequencies include a first communication frequency $f_{S1}$ used by the radio nodes to call the portable terminals via the call/response channel 21, a second communication frequency $f_{R1}$ utilized by the portable terminals to send a response to the radio nodes via the call/response channel 21, a third communication frequency $f_{S2}$ used by the nodes to call the terminals via the radio communication channel 22, and a fourth communication frequency $f_{R2}$ used by the terminals to send a response to the nodes via the radio communication channel 22. On to the call/response channel 21, all radio nodes 3 send an identical signal like in a case of a broadcasting operation. On the other hand, a response from each portable terminal 4 is received by the radio node 3 in the vicinity thereof. Depending on the radio node 3 having received the response from the portable terminal 4, the position of the portable wireless terminal 4 is detected such that the switch 1 specifies via the call/response channel one of the radio nodes for the communication with the portable terminal 4 and one of the time-division multiplexed channels assigned to the radio node 3.

As shown in FIGS. 2A and 2B, the call/response channel 21 is associated with time frames 21C and 21R having a relatively long period of, for example, one second. Each time frame is subdivided into N portions, where N denotes the number of portable terminals accommodated in the system, thereby creating a plurality of time slots CA1 to CAN and RP1 to RPN. For example, assuming the number of accommodated portable terminals to be 1000, namely, N=1000; the system allocates a period of time of about one millisecond to each terminal. The transmission frequency $f_{S1}$ from the radio nodes to the terminals and the reception frequency $f_{R1}$ from the terminals to the radio nodes are synchronized with the time frames 21C and 21R, respectively. However, there need not be necessarily established a phase matching therebetween. Under this condition, each terminal is assigned with a transmission time slot and a reception time slot. For example, a portable terminal having a terminal number 1 is assigned with time slots CA1 and RP1.

On the other hand, as shown in FIGS. 2C and 2D, the radio communication channel 22 is associated with time frames 22D and 22U having a relatively short period of, for example, ten milliseconds. These time frames are subdivided into time slots TS1 to TSM and TR1 to TRM. Each radio node assigns each terminal communicating therethrough with a transmission time slot and a reception time slot selected from time slots available at the point of assignment. Consequently, the number of time slots constituting a frame limits the number of communications which can be simultaneously connected through the radio node. For example, for M=10, a radio node can communicate with up to ten portable terminals.

Between the radio node and the portable terminals, various commands and messages are communicated by use of these particular time slots assigned to the terminals through the channels 21 and 22.

FIGS. 3A and 3B show configurations of frames on channels of the time-division highway 2 between the radio nodes 3 and the radio channel control unit 5. This constitution comprises a channel SHW from the switch 1 to the nodes 3 on the highway 2 and a channel RHW from the nodes 3 to the switch 1 on the highway 2. On the time-division highway 2, like in a case of an ordinary time-division switch, a time frame having a period of 125 microseconds is subdivided into an appropriate number (128 in the example of FIG. 3) of time slots. These time slots are assigned to the communication and control channels according to an appropriate ratio based on amounts of information items passing through the respective channels. In the example of FIG. 3, the 63rd slot is assigned to the control channel, whereas the other slots including slots from the 0th slot to the 62nd slot and slots from the 64th slot to the 127th slot are entirely assigned to the communication channel.

Of the radio channels shown in FIG. 2, the call/response channels 21 (21C, 21R) and the radio communication channels 22 (22D, 22U) respectively correspond to the control and communication channels of FIG. 3.

The control channel is shared among the radio nodes. In consequence, information passing through the highway SHW from the radio channel control unit 5 to a radio node 3 is received by all radio nodes 3, which in turn broadcast the received signal to the portable terminals 4. The information transmitted from the control unit 5 via the highway SHW to the radio nodes 3 includes polling information for the associated radio node. The node specified by the polling information can transmit information for the radio channel control unit 5 via the control channel on the highway RHW from the node to the control unit 5. This resultantly prevents a plurality of radio nodes from simultaneously accessing the control channel.

FIG. 4 shows the constitution of the radio node for achieving an exchange between the radio channels 21 and 22 of FIG. 2 and channels on the time-division highway of FIG. 3 or a transfer of information therebetween.

The configuration of FIG. 4 includes a highway SHW 401 from the radio channel control unit 5 to the radio nodes 3 (which will be called a transmission highway herebelow in this specification). The system further includes a channel timing control circuit 415 which acquires a frame signal from the transmission highway 401 to detect a position with respect to time of each time slot on the highway 401 so as to determine a timing to get information from the highway 401 and a timing to send information thereto. On the radio channel, a time frame is also generated in synchronism with a frame on the highway 401.

Control channel information on the transmission highway 401 is acquired into a call register 403 at a timing specified by the channel timing control circuit 415. The obtained information is transmitted to a modulator 404 at a point related to one of the time slots CA1 to CAN of FIG. 2 in association with a portable terminal number contained in the channel information. The modulator 404 modulates the transmission information with a carrier having a frequency $f_{S1}$ produced from an oscillator (frequency source) 405 to send the information from an antenna 417.

On the other hand, information sent from the portable terminal 4 onto the response channel is received via the antenna 417 and a channel separation filter 416 in a reverse fashion as compared with the transmission signal. The received information is then demodulated by a demodulator 407 operating with a reception frequency $f_{R1}$ produced from an oscillator 408. The demodulated resultant signal is stored in a response register 406 together with a portable terminal number as the call initiator determined from an associated time slot position on the response channel. The content of the response register 406 is transmitted, when a polling indication contained in the information stored in the call register 403 specifies the number of the pertinent node, onto a time slot of the control channel of the reception highway (RHW) 402 to the radio channel control unit 5.

The communication channels on the time-division highway 2 are fixedly assigned with the radio communication channels of the respective radio nodes TS1 to TSM and TR1 to TRM, where there is established a one-to-one correspondence therebetween. For example, the 0th time slot of the time-division highway 2 corresponds to the first radio communication channel TS1 of the radio node 3 connected to the highway 2. Consequently, each radio node 3 gets objective information from the transmission highway 401 in response to a timing signal supplied from the channel timing control circuit 415 so as to then transmit the information at a timing of a predetermined radio communication channel to a partner terminal. The information here is modulated by a modulator 411 with a radio carrier having a frequency $f_{S2}$ created from an oscillator 411. Moreover, information received from the radio communication channel is demodulated by a demodulator 413 operating with a reception frequency $f_{R2}$ generated from an oscillator 414 to be stored in a reception register 412. The information is thereafter transmitted onto a predetermined time slot of the time-division highway 2.

Figure 5:
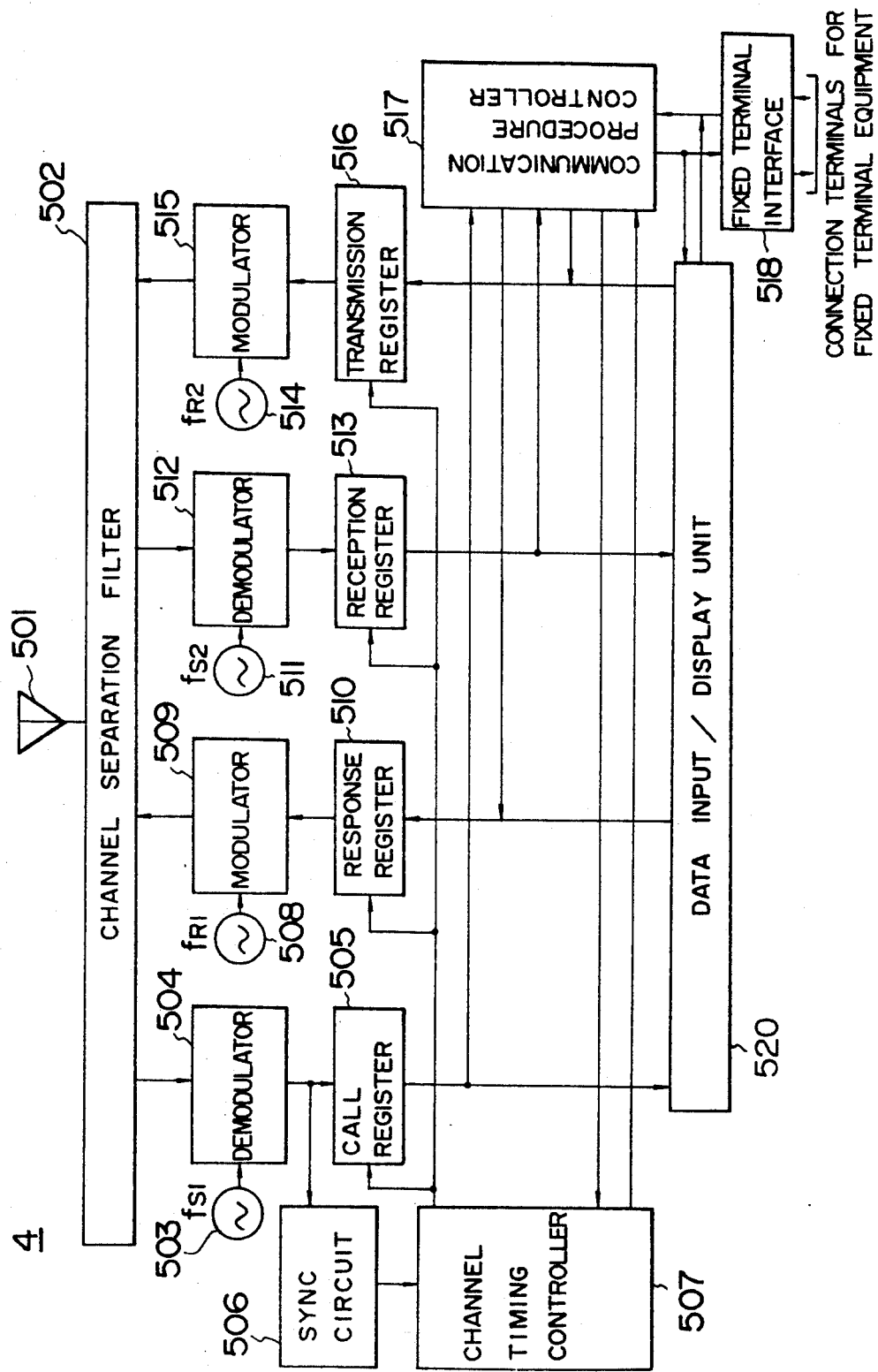
FIG. 5 is a block diagram showing in detail the configuration of a portable terminal 4.

FIG. 5 shows the constitution of the portable terminal in which radio wave propagating radio channels are communicated through an antenna 501 and a channel separation filter 502.

First, the radio wave having a frequency $f_{S1}$ from the call channel is demodulated by a demodulator 504 operating with a frequency $f_{S1}$ produced from a frequency source 503 such that a synchronization circuit 506 detects a time frame signal. The time frame signal is supplied to a channel timing control circuit 507, which in turn generates therefrom various kinds of operation timing pulses to control synchronous operation of the constituent components of the terminal.

The demodulator 504 sends the demodulated result to a call register 505 at a timing of a time slot of the call channel assigned to the terminal. The content (e.g. a call signal) of the call register 505 is analyzed by a communication procedure control circuit 517. As a result, a change takes place in the internal state of the control circuit 517 in association with the call processing state; furthermore, portions of the information are outputted to a data input/display unit 520 for a display thereof if necessary. Information sent from the data input/display unit 520 or a fixed terminal interface circuit 518 or an information item selected from information created as a result of an event to be supplied to a response channel is stored in a response register 510. The stored information is then fed to a modulator 509 at a predetermined timing which matches a time slot assigned to the associated terminal, said timing being specified by the channel timing control circuit 507. The information is modulated for a transmission thereof with a radio carrier of a frequency $f_{R1}$ produced from a frequency source 508.

For the radio communication channel, the time slots to be used here among the time slots TS1 to TSM and TR1 to TRM are specified by the radio channel control unit 5 via the call channel 21C. The specified information is stored in the channel timing control circuit 507. The timing control circuit 507 creates a timing signal in the specified time slot of the radio communication channel. Of information on the radio communication channel demodulated by a demodulator 512 operating with a frequency $f_{S2}$ from a frequency source 511, reception information associated with the time slot is loaded in a reception register 513. Depending on the content of the stored information, the internal state of the communication procedure control circuit 517 is altered and an information display takes place on the data input/display unit 520. Moreover, data supplied from the data input/display unit 520 and information items generated in association with an event are stored in a transmission register 516 so as to be supplied to a modulator 515 at a predetermined timing associated with a specified time slot of the radio communication channel. The resultant signal is modulated with a radio carrier having a frequency $f_{R2}$ produced from a frequency source to be transmitted to the radio node.

When a portable radio terminal 8 is attached to (linked with) a fixed terminal 8, the internal state of the communication procedure control circuit 517 is transmitted via the fixed terminal interface circuit 518 to a communication procedure control circuit (denoted with a reference numeral 601 in FIG. 6) in the fixed thermal 8. Moreover, for an operation in a case where the fixed terminal 8 is separated from the portable terminal 4, the internal state related to the D channel of a communication procedure control circuit of the fixed terminal 8 is passed to the control circuit 517 of the portable terminal 4 to be stored therein.

Figure 6:
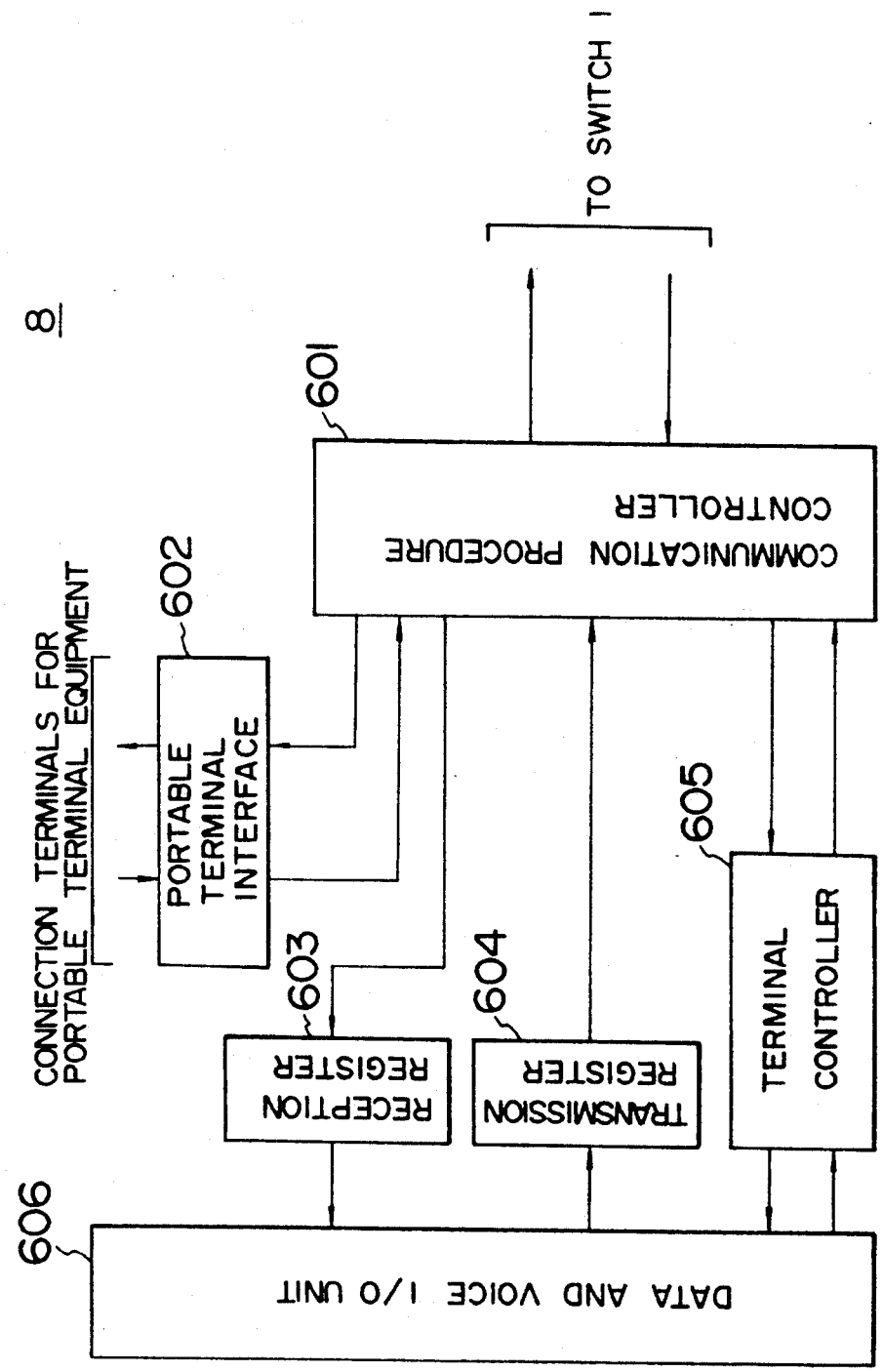
FIG. 6 is a block diagram showing in detail the structure of a fixed terminal 8 in which a portable terminal is installed.

Referring next to FIG. 6, the configuration of the fixed terminal 8 will be described.

The communication procedure control circuit 601 is connected to the switch 1 through an ordinary ISDN user interface to conduct the 2B+D communication procedure. The control circuit 601 communicates the internal state via a portable terminal interface circuit 602 with the communication procedure control circuit 517 in the portable terminal 4 so as to establish the own internal state depending on information of the internal state received from the portable terminal 4.

The fixed terminal 8 achieves such other functions, in a similar fashion as for the ordinary ISDN terminal equipment, as a function to load a reception register 603 or a transmission register 604 with a portion of information communicated with the switch 1 via the communication procedure control circuit 601, a function to send the stored information to the switch 1, and a function to display the information of the transmission register 604 and/or reception register 603 on a data and voice input- /output unit 606 or to acquire information therefrom under control of a terminal control circuit 605.

Figure 7:
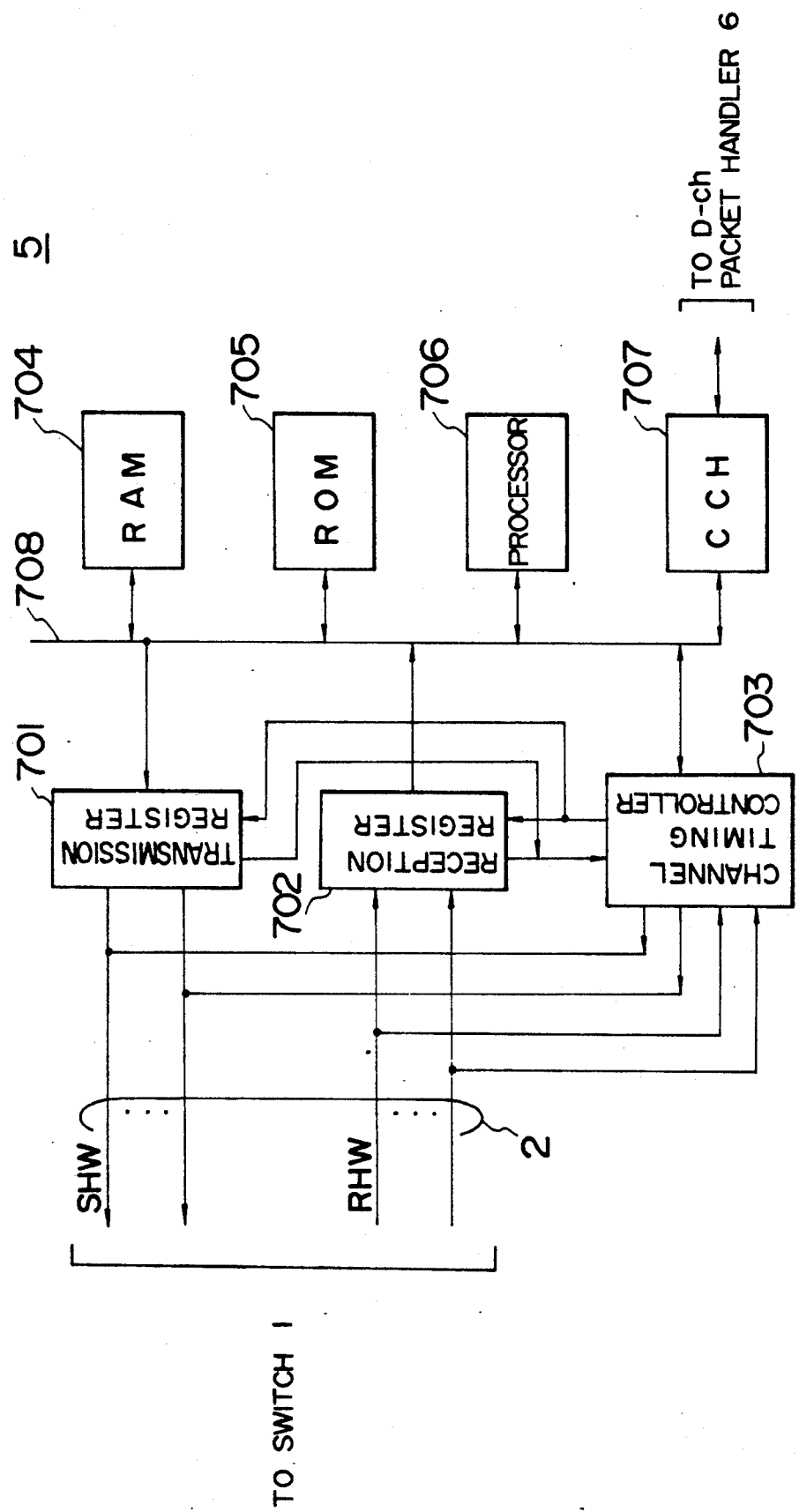
FIG. 7 is a block diagram showing in detail the constitution of a radio channel control unit 5.

FIG. 7 shows the constitution of the radio channel control unit 5 in which the time-division highway 2 is linked via the time-division switch 1 with a transmission register 701 and reception register 702. The transmission highway SHW from the radio channel control unit 5 to the radio nodes 3 and the reception highway RHW from the nodes 3 to the control unit 5 are connected to the transmission and reception registers 701 and 702, respectively. A plurality of transmission registers 701 and a plurality of reception registers 702 may be disposed in association with the number of the employed highways. Information is communicated between the time-division highways and the transmission and reception registers 701 and 702 at a timing synchronized with a timing control pulse created from a channel timing control circuit 703. The channel timing control circuit 703 monitors time frame pulses on the time-division highways to produce timing control pulses, which are used to transmit information from the transmission register 701 onto a control channel of the time-division highways or a communication channel assigned to each send/receive information item and to acquire information from the communication channel into the reception register 702.

The radio channel control unit 5 further includes such constituent components as a microprocessor 706, a random access memory (RAM) 704 to be used as a working area for data processing, a read-only memory (ROM) 705 for storing therein programs defining operations of the microprocessor 706, and a communication channel (CCH) 707 for communicating D-channel information between the radio channel control unit 6 and the D-channel packet handler 6. These components are interconnected with each other via a processor bus 708.

The microprocessor 706 conducts in accordance with the programs loaded in the ROM 705 such control operations associated with instructions of various commands sent from the call control processor 7 via the D-channel packet handler 6 for call processing, for example, assignment and release of radio communication channels from the portable terminals 4 to the radio communication channels and relay operations of call control signals from the terminals 4 to the control processor 7 and various commands from the control processor 7 to the portable terminals 4.

FIG. 8 shows the configuration of the D-channel packet handler 6. The D channel of various ISDN terminals accommodated in the PBX switch 1 is connected via subscriber lines and the time-division switch 1 to a transmission register 801 and a reception register 802. The transmission highway from the D-channel packet handler 6 to the terminals 8 and the reception highway from the terminals 8 to the handler 6 are linked with the transmission and reception registers 801 and 802, respectively. A plurality of transmission and reception registers 801 and 802 may be respectively disposed in association with the number of highways used.

Information communications between the time-division highways 10 and the transmission and reception registers 801 and 802 are carried out at a timing synchronized with a timing control pulse created from a channel timing control circuit 803. The channel timing control circuit 803 monitors time frame pulses on the time-division highways to produce timing control pulses, which are used to transmit information from the transmission register 801 onto a control channel of the time-division highways or a communication channel assigned to each send/receive information item and to acquire information from the communication channel into the reception register 802.

The system further includes a communication procedure control circuit or controller 804, which achieves a termination operation of the second layer for D-channel information communicated with ISDN terminals via the transmission and reception registers 801 and 802. That is, the controller 804 achieves such operations as an operation to assemble or to disassemble LAPD frames of transfer and/or reception information and an operation to control addresses of ISDN terminals as receiving terminals or call destination terminals of D-channel packets.

Upper-layer processing of D-channel packets are accomplished by use of a microprocessor 807 and its peripheral circuits. These circuits includes a random access memory (RAM) 805 for temporarily storing therein data and for being used as a working memory for data processing, a read-only memory (ROM) 806 for storing therein programs defining operations of the microprocessor 807, a communication channel (CCH) 809 for achieving communications of call control information between the call control processor 7 of the PBX switch 1 and the D-channel packet handler 6, and a communication channel (CCH) 808 for conducting communications of D-channel information between the radio channel control unit 5 and the D-channel packet handler 6. These constituent components are interconnected to each other by use of a processor bus 810.

The microprocessor 807 conducts, according to the programs stored in the ROM 806, a third-layer processing of D-channel information from the communication procedure controller 804 in which the LAPD termination of the D-channel information has been achieved. As a result, call control information is sent to the call control processor 7. For a transmission to a destination terminal, user information is again passed to the communication procedure controller 804 to undergo the second-layer processing. User information is then sent via the transmission register 801 to the switch 1 of the speech path. D-channel information which undergoes the LAPD termination in the radio channel control circuit 5 and which is transmitted via the radio channel CCH 808 is also subjected to the similar processing such as the third-layer processing and the discrimination processing to discriminate call control information from user information. Furthermore, in order to achieve the continuation of a call connection between the D channel associated with the portable terminal 4 and the D channel related to the fixed terminal 8 in which the portable terminal 4 is installed, there are accomplished such processing as processing to establish relationships associated with terminal addresses and address translation processing.

Referring next to FIGS. 9A to 9E, 10A and 10B, and 11, a description will be given of the operation of the channels and the blocks constituting the system. As an example of the operation, a telephone speech will be here described.

Figure 9B:
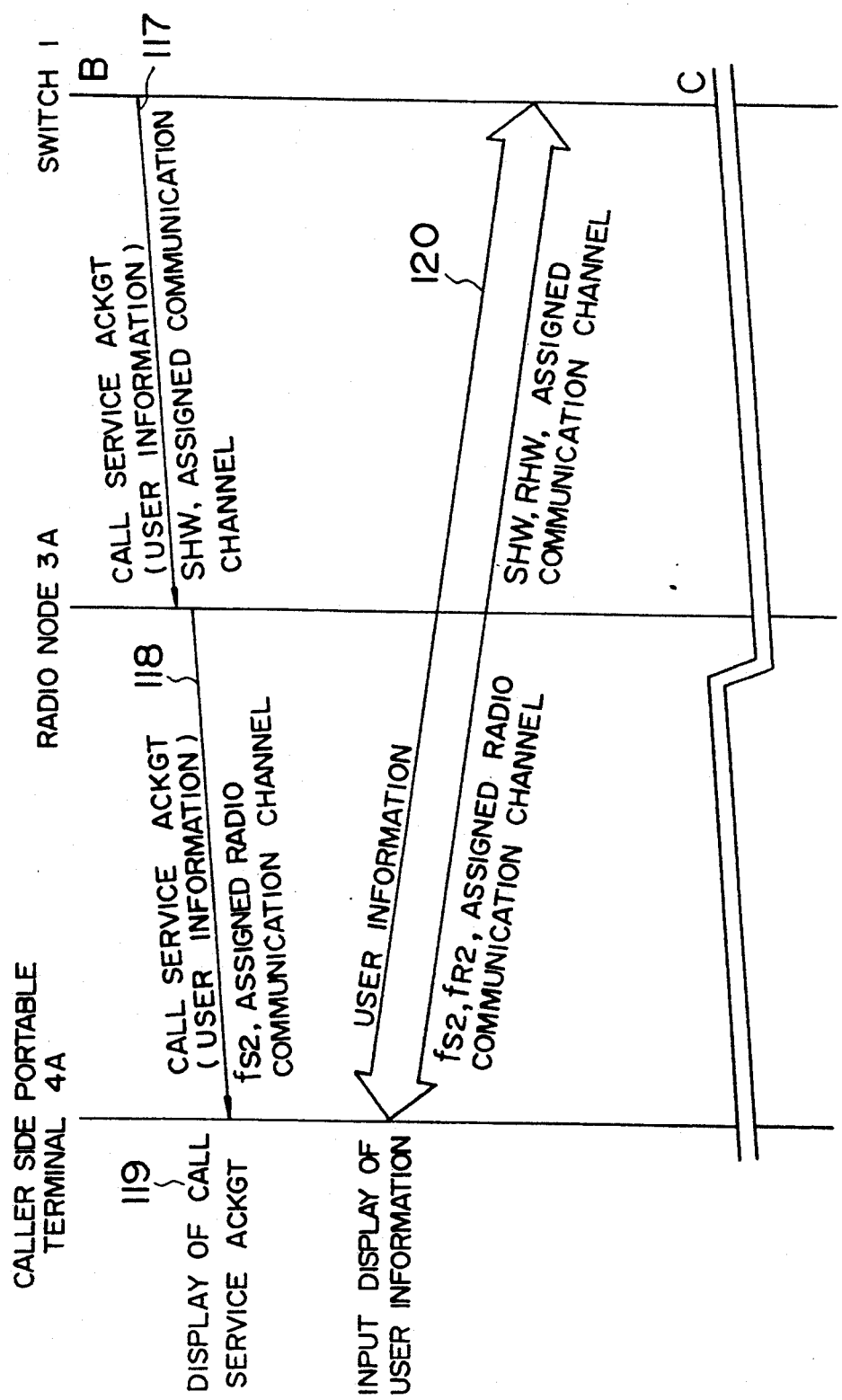

FIGS. 9A to 9E show communication procedures between a caller side portable terminal 4A, a radio node 3A communicating radio waves with the terminal 4A, and the switch 1. In this regard, these figures show an operation of the switch 1 accomplished together with the three blocks including the radio channel control unit 5, the D-channel packet handler 6, and the call control processor 7. FIGS. 10A and 10B show communication procedures between the called party portable terminal 4B, the radio node 3B, and the switch 1. FIG. 11 shows communication procedures between the switch 1 and the fixed terminals 8A and 8B in which caller and called side portable terminals 4 are respectively installed. In these procedure charts, there are indicated over each arrow mark the content of a signal to be transmitted or a communication channel number and/or a terminal address number specified by the content; whereas, there are designated below the arrow mark a highway or radio carrier by which the transmission information is transmitted and a time-division channel employed for this operation. Furthermore, alphabetic letters such as A to F denote transitions of sequences between these charts. For example, when the sequence of FIG. 9A is accomplished up to A, a sequence from A and B of FIG. 10 is conducted.

In the sequence chart of FIG. 9A, the switch 1 continuously transmits a time frame onto the control channel of the transmission highway SHW (step 100). The radio node 3A transmits a time frame onto a position CAN on the carrier $f_{S1}$ in synchronism with the time frame sent from the switch 1 (step 101). In order to initiate a call, the caller side portable terminal 4A outputs information of a call initiation indication onto a time slot position of the carrier $f_{R1}$ allocated to the own terminal (step 102). On receiving the call initiation signal, the radio node 3A determines a terminal number based on the time slot position to set information of the call initiation designation, the terminal number, and the own radio node number on the control channel of the reception highway, thereby transmitting these items to the switch 1 (step 103). When these information items are received, the switch 1 judges to determine an area of the radio node associated with the caller terminal 4A to allocate a speech channel number on the SHW and RHW used by the caller terminal 4A for the speech and a radio speech channel number on the radio carriers $f_{S2}$ and $f_{R2}$ so as to then send these numbers to the radio node 3A together with a call initiation acceptance signal (step 104). The radio node 3A adds the allocated radio channel number to the call initiation acceptance signal to send the resultant signal onto a time slot at a position associated with the caller terminal number on the carrier $f_{S1}$ (step 105). On receiving the information items above, the portable terminal 4A adds such information items necessary for a setting of a speech as a called party or person number and a call class specification to the received information, thereby sending the resultant items onto a time slot associated with the allocated radio channel number on the carrier $f_{R2}$ (step 106). When these items are received, the radio node 3A transmits the reception information including a reception confirmation signal, a called party number, and a call class information through the allocated speech channel of the reception highway RHW to the switch 1 (step 107). Through the communication procedures above, a speech channel is established for a speech between the caller side portable terminal 4A and the switch 1.

A call setting or establishing sequence is passed to a branch symbol A of FIG. 10A. On receiving the called party number, the switch 1 sends a call signal and the called party number via the control channel of the transmission highway SHW to all radio nodes 3 (step 108). When the signal and the number are received, each of the radio nodes 3 including the radio node 3B loads a call signal in a time slot associated with the called party terminal number on the carrier $f_{S1}$ to transmit the resultant information (step 109). When the call signal is received, the called party terminal 4B transmits, if the terminal 4B is in a state ready to send a response thereto, a response signal onto a time slot associated with the own terminal number on the carrier $f_{R1}$ (step 110). On receiving the response, the radio node 3B adds a terminal number and a radio node number thereto and then returns the resultant signal to the switch 1 via the control channel of the highway RHW (step 111).

The switch 1 having received the response signal assigns, in order to establish a speech path to the called party terminal 4B, a speech channel between the switch 1 and the radio node 3B and a radio communication channel between the radio node 3B and the terminal 4B. The switch 1 then adds the called party number, the radio node number, th communication channel number of the time-division highway, and the radio communication channel number to information including a response acceptance signal, a call initiator number, and a call class indication. The resultant data are sent to the control channel of the highway SHW (step 112). On receiving the data, the radio node 3B adds the radio communication channel number to the caller number and the call class indication so as to send the resultant signal onto a time slot associated with the called with the called party number on the carrier $f_{S1}$ (step 113). When the signal is received the called party terminal 4B notifies the call termination to the user and displays the caller side number (or a caller name converted therefrom) and the call class which is a telephone call in this case (step 114). Subsequently, when the called partner inputs a call acknowledgement by use of keys, the called party terminal 4B sends information of the reception confirmation for the response acceptance number as well as call acknowledgement indication information onto the radio communication channel of the carrier $f_{R2}$ (step 115). The radio node 3B loads the communication channel assigned to the communication on the highway RHW with the received reception confirmation information and the call acknowledgement information to return these items to the switch 1 (step 116).

When the switch 1 receives the reception confirmation, the time-division highway and the radio and communication channels are assumed to be established between the switch 1 and the called partner portable terminal 4B. Furthermore, it is possible in this state that the user information can be communicated through the D channel between the caller side terminal 4A and the called partner 4B.

Thereafter, the communication sequence returns to the transfer symbol B of FIG. 9B such that the switch 1 transmits the call service acknowledgement from the called partner terminal 4B via the radio node 3A to the called terminal 4A by use of the communication channel established between the switch 1 and the caller terminal 4A (steps 117 and 118). The acknowledgement is presented on the display of the call initiator terminal 4A (step 119). After this point, the telephone communication can be accomplished between the caller and the called partner (through a sequence including a step 120 of FIG. 9B and a step 121 of FIG. 10B linked therewith via a transfer symbol C).

In this connection, in the step 114, if the called person cannot receive the call at the moment, it may also be possible to select a request for the call, for example, to issue a character message of the condition to the call initiator so as to reserve the call, to return a message that the called person makes a return call later to the caller, to transfer the call to a secretary of the called person to receive the call, or to send the message to the voice and/or electronic mail.

Next, a description will be given of a speech operation conducted between the fixed terminals 8A and 8B.

In a first step 130 of the communication sequence of FIG. 11, when the caller side portable terminal 4A is attached to (installed in) the fixed terminal 8A, the fixed terminal 8A supplies the switch 1, by use of the D channel of the user interface associated with the ordinary ISDN, with information as to a portable terminal installation indication, a terminal end-point identifier (TEI, a terminal identification address standardized in the LAPD), a terminal number of the attached terminal 4A (sent by means of a user pad of the LAPD), and a call class for the connection (step 131). On receiving these information items, the switch 1 returns a reception confirmation signal to the fixed terminal 8 (step 132). In this operation, based on the received portable terminal number and call class information items, the call processing of the D-channel connection established via a radio channel between the caller side terminal 4A and the called partner terminal 4B including processing for the call control signals communicated via the D channel and the process history up to this point is passed or transferred to the call processing of the D-channel connection in the fixed terminal 8A in which the caller terminal is installed.

When the caller side portable terminal 4A is installed in the fixed terminal 8A (step 130), the operation of the portable terminal 4A enters the sequence denoted by a symbol D in FIG. 9C to issue a request for releasing the radio channel established between the terminal 4A and the switch 1 and the communication channel of the time-division highway (step 140). The request is passed to the radio node 3A through the radio communication channel of the carrier $f_{R2}$ assigned to the terminal 4A and then the radio node 3A transfers the request via the communication channel of the highway RHW to the switch 1 (step 141). On receiving the release request, the switch 1 transmits a release instruction to the radio node 3A (step 142). The radio node 3A then sends a release instruction to the portable terminal 4A (step 143). Thereafter, on receiving a response from the terminal 4A (step 144), the radio node 3A returns a response to the switch 1 (step 145), thereby completing the release operation. The release instruction and response are communicated by use of the control channel of the time-division highway and the time slots for the terminal numbers associated with the carrier frequencies $f_{S1}$ and $f_{R1}$.

Also in the called partner terminal 4B, when the portable terminal 4B is installed in the fixed terminal 8B, a call processing sequence designated by a symbol E in FIG. 10B is immediately accomplished to execute steps 140' to 145', which are similar to the Operation steps conducted on the caller side as above, to release the radio channels.

Returning now to FIG. 11, when the D channel is completely transferred (step 132), call processing is achieved, like in the case of the ordinary wire ISDN terminal, for establishing a connection of the B channel for a speech therethrough (steps 133 to 135).

Next, a description will be given of a call processing sequence in a case where after a call is once completed, a portable terminal, for example, the terminal 4A is separated from the fixed terminal 8 with the call connection kept continued.

The call processing sequence of the separation of the fixed terminal 8 is commenced when the caller removes the portable terminal 4A from the fixed terminal 8A as shown in the step 150 of FIG. 11. In this regard, the sequence from the step 150 up to the end of the call service is accomplished in the completely same manner also on the called partner side. Consequently, the description will be given only of the operation achieved on the caller side. On recognizing that the portable terminal 4A has been separated therefrom, the fixed terminal 8A sends information denoting the terminal separation via the D channel to the switch 1 (step 151). In response thereto, the switch 1 instructs release operations of the D and B channels linked with the fixed terminal 8A (step 152). When a release confirmation is received from the fixed terminal 8A, the release processing is assumed to be completed in the switch 1. After the B and D channel release instruction is issued, the switch 1 proceeds to an operation sequence indicated with a transfer symbol F of FIG. 9D to carry out a procedure for establishing a D channel through a radio channel between the portable terminal 4A and the switch 1. In order to resume the call, the portable terminal 4A transmits an indication signal of terminal separation on a time slot position of the carrier $f_{R1}$ allocated to the terminal 4A (step 162). This signal is carried to the switch 1 together with the portable terminal number and the radio node number via the control channel of the reception highway (step 163). When these information items are received, the switch 1 sends back a speech channel number on the SHW and RHW and a radio speech channel number assigned to the radio terminal 4A together with a release acceptance signal to the radio node 3A (step 164). Among these information items, the radio channel number and the release acceptance signal are sent to the portable terminal 4A by the radio node (step 165). On receiving the information items above, the portable terminal 4A transmits the fixed terminal number and a call class specification, which are passed from the fixed terminal 8A, to the assigned radio communication channel on the carrier $f_{R2}$ together a call resume indication signal and the portable terminal number (step 166). These information items are carried to the switch 1 by the radio node via the assigned communication channel on the reception highway RHW (step 167). After the D channel is established through a radio channel, the processing associated with call control signals communicated by us of the D channel connection established between the fixed terminal 8A and the switch 1 up to the terminal separation point is transferred together with the processing history up to this point to the control of the new connection between portable terminal 4A and the switch 1.

Steps 170 to 175 of FIG. 9E show a call processing sequence to be conducted at an end of a call service. This processing sequence is completely the same as the sequence including the steps 140 to 145 effected for a radio communication channel release when the portable terminal is installed in the fixed terminal.

In the foregoing example, the description has been given of a case where the call is initiated in a state in which the portable terminal is separated from the fixed terminal in both of the caller and called sides. However, it is naturally possible to start a call in a state where the portable terminal is attached to the fixed terminal on one of or both of the caller and called sides. In a case where the portable terminals 4 are attached to the fixed terminals 8 with a call not established therebetween, the fixed terminal 8 sends a portable terminal number associated therewith via the D channel to the switch 1, which keeps the correspondence between the portable terminal number and the fixed terminal. As a result, like in the ordinary wire ISDN terminal, for the call initiation and termination, the D channel of the subscriber's line is used to communicate the call control information items. On the other hand, in a case where one of the portable terminals is installed in the fixed terminal with the other portable terminal separated from any fixed terminals, the operation to be achieved on the side of the separated terminal is achieved in conformity with the call processing sequence described in conjunction with FIGS. 9A to 9E or 10A and 10B; whereas, the operation on the installed terminal side need only conform to the call processing sequence similar to the sequence of the ordinary wire ISDN terminal.

Referring next to FIGS. 12A and 12B, 13, and 14A and 14B, a description will be given of a method of transferring and continuing D-channel call processing in a case where a portable terminal 4 is installed in and/or separated from a fixed terminal 8.

Figure 12:
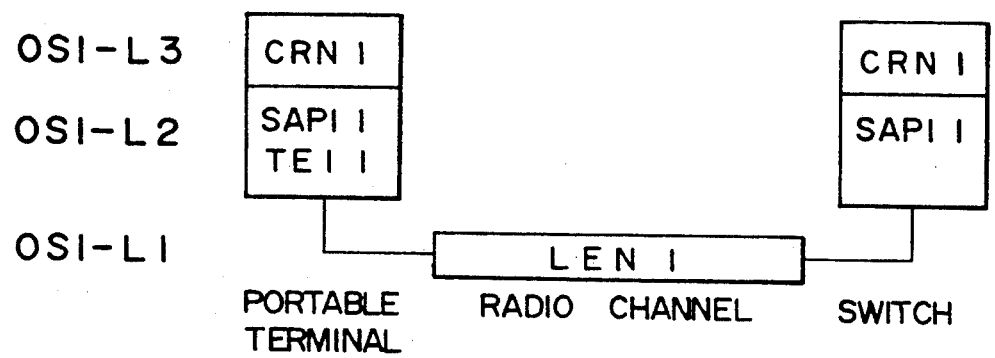
FIGS. 12A and 12B are diagrams for explaining parameters of layers 1 to 3 associated with D-channel call connection processing of a portable terminal and a fixed terminal.
Figure 12:
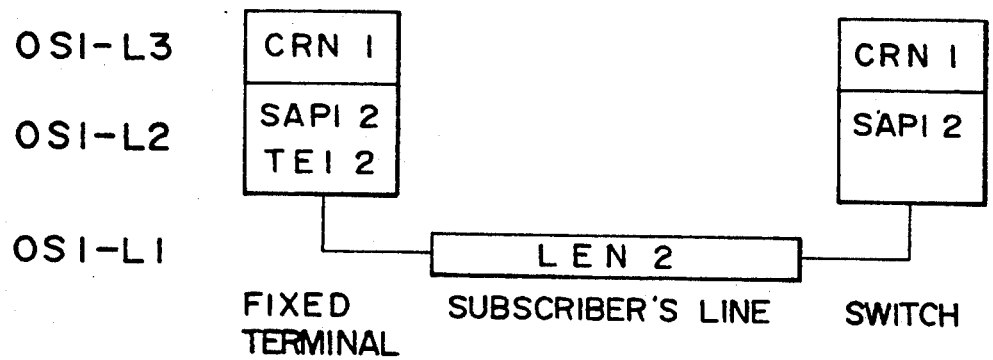

FIGS. 12A and 12B show a method of identifying calls or logical channels standardized for the user ISDN interface. In these figures, OSI-L1, OSI-L2, and OSI-L3 respectively designate layers 1, 2, and 3 of the layer construction of communication protocol Open System International (OSI).

FIG. 12B shows a layer configuration adopted in the conventional telephone communication system. In this system, a call reference number (CRN) of the layer 3 corresponds to a combination of such items as a terminal accommodating a subscriber's line of a switch, namely, a line equipment number (LEN) identifying a line equipment (subscriber's line) adopted in the layer 1, a terminal end-point identifier (TEI) designating one of plural terminals generally connected to the subscriber's line, and a service access point identifier (SAPI) denoting a service access point on the layer 2. In other words, a combination of parameters LEN2, TEI2, and SAPI2 is associated with CRN1. The correspondence therebetween is kept unchanged through the call processing.

In the embodiment according to the present invention, in a case where a portable terminal in a free state initiates a call, the content of CRN1 is associated with a combination of LN1, TEI1, and SAPI1 as shown in FIG. 12A. When the portable terminal is attached to the fixed terminal during a call, the CRN1 corresponds to a combination of LEN2, TEI2, and SAPI2 associated with the fixed terminal in which the portable terminal installed as shown in FIG. 12B. In FIG. 12A, LEN1 denotes an information transmission path between the portable terminal and the switch, the path being called a radio channel here and including a radio communication channel associated with time slots on the carrier $f_{S2}$ and $f_{R2}$ between the portable terminal and the radio node and a time-division highway between the radio node and the switch.

In a case where the call is to be continued also after the portable terminal is separated from the fixed terminal, there is allocated as a line equipment a new radio channel different from the channel used before the installation of the portable terminal. Assuming the new radio channel is assigned with an identifier LEN3 (not shown), CRN1 corresponds to a combination of LEN3, TEI1, and SAPI1 in the portable terminal separated from the fixed terminal.

Figure 13:
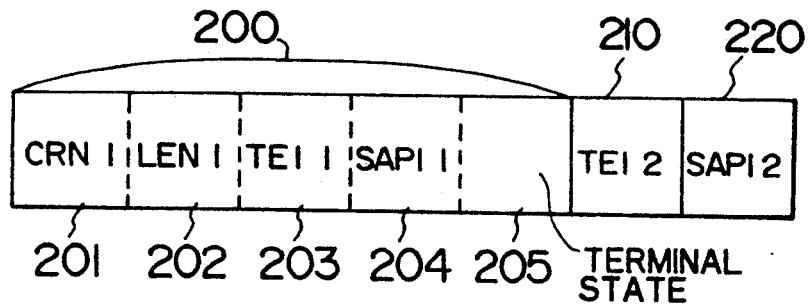
FIG. 13 is a schematic diagram for explaining the parameters associated with call connection control information transferred through a D channel of the portable or fixed terminal, said parameters being sent from the terminal to the switch when a change takes place in the states of layers 1 and/or 2.
Figure 14A:
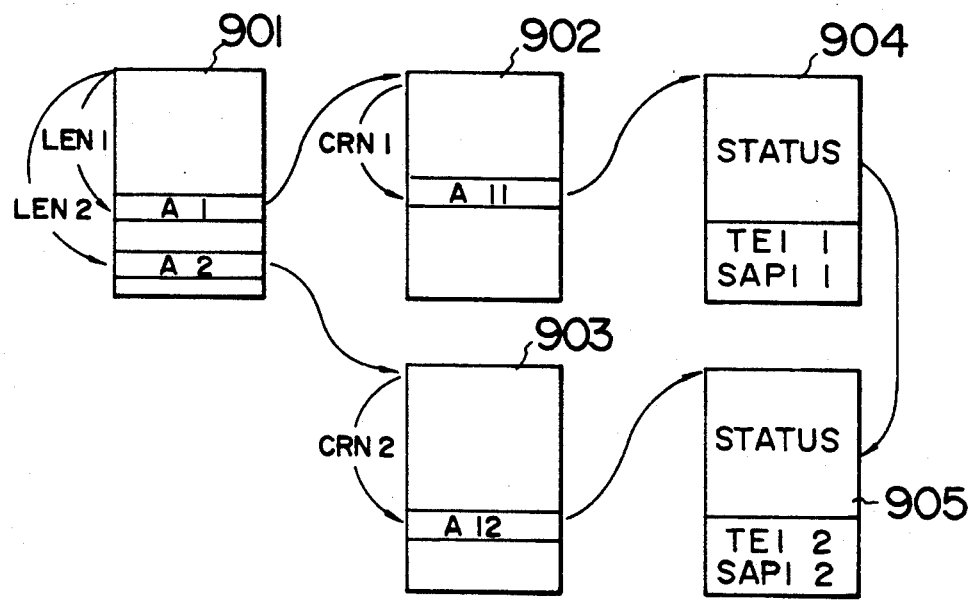
FIGS. 14A and 14B are diagrams useful to explain an embodiment of the call resource table continuation method used in the D-channel packet layer 3 processing.
Figure 14B:
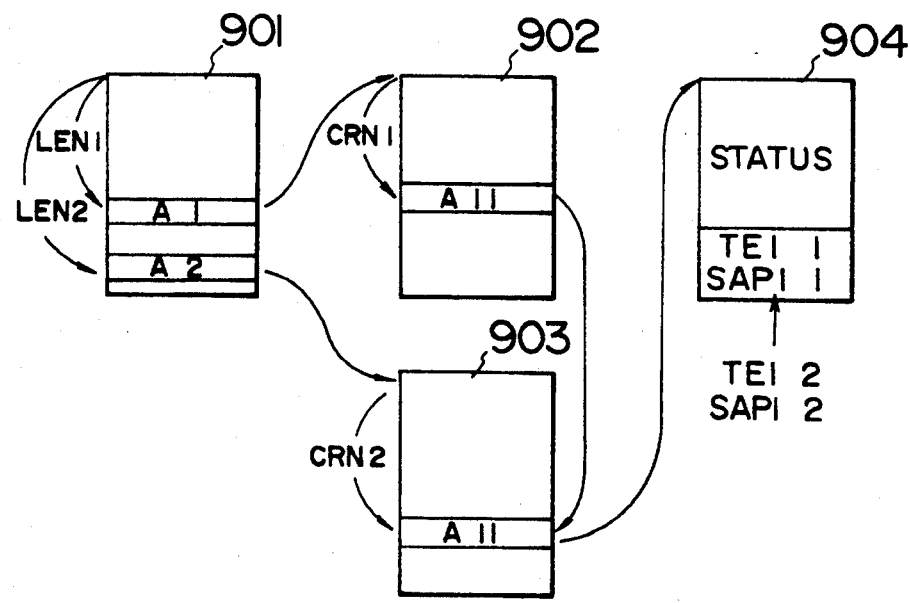

Referring now to FIGS. 13, 14A, and 14B, a description will be given of a method of continuing call processing in a case where constituent elements of the layer 1 or 2 are replaced with other items during a continuation of a call as described above.

FIG. 13 shows a portion of a first call control packet sent from the fixed terminal to the switch when the portable terminal is installed in the fixed terminal. This layout includes a TEI field 210 and an SAPI field 220, which are respectively loaded with an identifier of the fixed terminal TEI2 and a service access point identifier (SAPI2) in the same fashion as for the case of a call initiation of an ordinary ISDN terminal. In the embodiment according to the present invention, in addition to these identifiers TEI2 and SAPI2, there is disposed a field 200 for layer 3 parameters. This field 200 is loaded with a call identification number (CRN1) 201 which has been set on the radio channel up to this point by the portable terminal, a line equipment number (LEN1) 202, an identifier (TEI1) 203 of the portable terminal installed in the fixed terminal, a layer 2 access point identifier (SAPI1) 204 of the call set in the portable terminal, and terminal state information 205 to identify that the pertinent call control packet is the first control packet transmitted from the fixed terminal in which the portable terminal is installed (or from which the portable terminal is separated).

Reservation of continuity of the call setting is achieved in the layer 3 processing associated with the D channel on the switch side. That is, the reservation is accomplished by use of a layer processing portion executed by the microprocessor system including the PROC 807 in the D-channel packet handler 6 and its peripheral circuits such as the RAM 805 and the ROM 806 of FIG. 8. In this regard, the layer 2 processing is executed for the radio channel in the radio channel control unit 5 of FIG. 7 and for the wire subscriber's line by the communication procedure controller 804 of FIG. 8.

FIG. 14A shows an example of the call identification method used in the layer 3. On receiving a call control packet, the switch first examines terminal state information 205. If the call control packet is found to have been issued from an ordinary ISDN terminal or is found to be a first call control packet transmitted from the terminal to set a call, the processing of FIG. 14A is executed. In this example, by use of LEN1 and CRN1 assigned at the call setting or establishing operation, a two-stage address retrieval is achieved to access a layer 3 (L3) call resource table 904. That is, in the first stage, data is read from a table 901 at an address associated with the value of LEN1. The data thus attained indicates a first address A1 of the second-stage table, namely, a CRN table 902. A field at the associated address of the CRN table 902 contains a first address A11 of the L3 call resource table 904. This table 904 is loaded with parameters such as TEI and SAPI defining a call establishing operation and status indication information (STATUS). Consequently, even when a transmission route between the terminal and the switch is changed, if the same L3 call resource table 904 can be accessed, the previous call setting and the preceding call processing can be continuously employed. Of several possible methods of implementing the call processing continuation above, two methods will now be described.

Under a condition that the call CRN1 is established from the portable terminal TEI1 via the radio channel LEN1, when the portable terminal is attached onto a fixed terminal, the fixed terminal sends a call control packet of FIG. 13 to the switch. In this situation, since the portable terminal has been installed in the fixed terminal, the field 205 designating the terminal state in FIG. 13 indicates a request for a connection change of the layer 2.

According to the method of FIG. 14A, the layer 3 having received the information (call control packet) sets, based on the subscriber's line number LEN2 to which the call control packet is inputted, a new CRN table 903 associated with a new call identification number (CRN2) and an L3 call resource table 905 so as to transfer the content of the preceding L3 call resource table 904 to the new L3 call resource table 905. Thereafter, the previous L3 resource table 904 is accessed by use of the LEN1 and CRN1 stored in the L3 parameter field 200 of FIG. 13. The new L3 call resource table 905 is loaded with content data obtained by replacing the values of TEI1 and SAPI1 in the content of the L3 call resource table 904 (to be used for a terminal information transfer from the layer 3 via the layer 2) with the values of TEI2 and SAPI2, respectively. The operation to transfer contents of the old L3 call resource table 904 to the new L3 call resource table 905 is conducted only when the terminal state designation 205 of the received call control packet indicates a request for a connection change of the layer 2.

In the method of FIG. 14B, the LEN2 and CRN2 are adopted to establish a connection like in the case above. However, there is not created a new L3 call resource table. Namely, the content (address All) of the table 902 obtained through a read operation by use of the CRN1 as a read address is copied onto an address position of CRN2 in the new CRN table 903. As a result, the L3 call resource table 904 having been used before the portable terminal is attached onto the fixed terminal can be accessed by use of the LEN2 and CRN2. In this case, the TEI1 and SAPI1 of the L3 call resource table 904 are replaced with the TEI2 and SAPI2 in the same manner as for the method of Fig. 14A. The operation to transfer the content All obtained from the address indicated by CRN1 to the memory position at the address of CRN2 and the operation to replace the TEI1 and SAPI1 respectively with the TEI2 and SAPI2 are accomplished only when the terminal state designation 205 of the received call control packet indicates a request for a connection change of the layer 2.

Incidentally, in a case where the portable terminal installed in the fixed terminal is separated therefrom with a call kept continued, assuming that a new radio channel assigned has an identification number LEN3, the fixed terminal produces a call control packet which is obtained from the packet of FIG. 13 as follows. Namely, the CRN1, LEN1, LEN2, TEI1, SAPI1, TEI2, and SAPI2 need only be replaced with CRN2, LEN2, TEI2, SAPI2, TEI3, and SAPI3. Under this condition, by substituting LEN3 for LEN2 in FIGS. 14A and 14B, the method used in the installation of the portable terminal in the fixed terminal can also be used in this case.

As described above, in accordance with the present invention, each portable terminal has characteristics as a mobile communication system; furthermore, various service items of the PBX communication system developing multiple functions through the ISDN interfaces can be advantageously utilized personally by each portable terminal via a fixed terminal nearby.

While particular embodiments of the invention have been shown and described, it will be obvious to those skilled in the art that various changes and modifications may be made without departing from the present invention in its broader aspects.

We claim:

1. A communication system comprising:
   a time-division switch for connecting a plurality of terminal apparatuses respectively via ISDN interfaces each including at least a control channel and a plurality of data channels and for controlling an exchange of information on said data channels based on control signals on said control channel;
   a call control processor connected to said time-division switch for being responsive to the control signals inputted from said control channels for achieving a control of a call between two terminal apparatuses to be communicated with each other;
   a plurality of fixed terminal apparatuses each being connected to said time-division switch through an ISDN interface;
   a plurality of portable terminal apparatuses each having means for coupling with one of said fixed terminal apparatuses, data input means, data display means, and radio communication means;
   a plurality of radio node units each connected via a time-division highway to said time-division switch and having means for communicating with said portable terminal apparatuses via radio channels;
   a radio channel control unit connected to said time-division switch for achieving communications of control signals and data with said portable terminal apparatuses via said time-division highway; and
   a control signal handling unit connected to said time-division switch for communicating control signals between the control channel of said ISDN interfaces and said call control processor and for communicating control signals between said radio channel control unit and said call control processor,
   the control signals supplied from said radio channels to said time-division switch being inputted to said call control processor through said radio channel control unit are similar to the control signals inputted from said control channels, and
   said ratio channel control unit being responsive to the control signals fed from said call control processor to determine time slots on said data highway for use in the data communication of said portable terminal apparatuses.

2. A communication system comprising:
   a time-division switch for connecting a plurality of terminal apparatus respectively via ISDN interfaces each including at least a control channel and a plurality of data channels and for controlling an exchange of information on said data channels based on control signals on said control channel;
   a call control processor connected to said time-division switch for being responsive to the control signals inputted from said control channels for achieving a control of a call between two terminal apparatuses to be communicated with each other;
   a plurality of fixed terminal apparatuses each being connected to said time-division switch through an ISDN interface;

a plurality of portable terminal apparatuses each having means for coupling with one of said fixed terminal apparatuses, data input means, data display means, and radio communication means;

a plurality of radio node units each connected via a time-division highway to said time-division switch and having means for communicating said portable terminal apparatuses via radio channels;

a radio channel control unit connected to said time-division switch for achieving communications of control signals and data with said portable terminals apparatuses via said time-division highway;

a control signal handling unit connected to said time-division switch for communicating control signals between the control channels of said ISDN interfaces and said call control processor and for communicating control signals between the control channel of said ISDN interfaces and said call control processor and for communicating control signals between said radio channel control unit and said call control processor, the control signals supplied from said radio channels to said time-division switch being inputted to said call control processor through said radio channel control unit are similar to the control signals inputted from said control channels, said radio channel control unit being responsive to the control signals fed from said call control processor to determined time slots on said data highway for use in the data communication of said portable terminal apparatuses;

each of said portable terminal apparatuses includes first storage means for storing therein a terminal identifier assigned thereto and status information as to a communication procedure of the portable terminal apparatus;

each of said fixed terminal apparatuses includes:

second storage means for storing a terminal identifier assigned thereto and status information as to a communication procedure of the fixed terminal apparatus, means operative, when either one of said portable terminal apparatuses in a communication status is coupled to the fixed terminal apparatus, for loading said second storage means with contents stored in said first storage means of said portable apparatus, and means operative, when either one of said portable terminal apparatuses in a communication status is coupled to the fixed terminal apparatus, for supplying said time-division switch via said control channel with a first control signal including the identifier of said coupled portable terminal apparatus, the identifier of the fixed terminal apparatus, the state of the fixed terminal apparatus, and information indicating the status of the communication procedure loaded to said second storage means;

said control signal handling unit includes third storage means for storing therein, a correspondence relationship between identifiers of two terminal apparatuses between which a call has been established and status information of the call; and means operative, when the first control signal is received, for converting the correspondence relationship specified by the identifier of the portable terminal apparatus contained in the first control signal into a new correspondence relationship between the identifier of said fixed terminal apparatus to which said portable terminal apparatus has been coupled and an identifier of one of terminal apparatuses with which said coupled portable terminal apparatus has been in communication.

3. A communication system according to claim 2, wherein:

each of said portable terminal apparatuses includes:

means for loading said first storage means with contents stored in said second storage means of said fixed terminal apparatus, and means operative, when the portable terminal apparatus is separated from a fixed terminal apparatus in a communication status, for supplying said time-division switch via said radio channel with a second control signal including the identifier of said fixed terminal apparatus, status information of the portable terminal apparatus, and status information of the communication procedure; and said call signal handling unit includes means operative, when the second control signal is received, for converting the correspondence relationship between the identifiers specified by the identifier of said fixed terminal apparatus contained in the second control signal into a new correspondence relationship between the identifier of said portable terminal apparatus and an identifier of one of terminal apparatus with which said fixed terminal apparatus separated from the portable terminal apparatus has been in communication.

* * * * *